DATA CONVERTER

Filed May 26, 1958

6 Sheets-Sheet 1

INVENTORS:
Max Palevsky
Robert M. Beck
George J. Giel

By Smyth & Roston
Attorneys

INVENTORS:
Max Palevsky
Robert M. Beck
George J. Giel
By Smyth & Roston
Attorneys

DATA CONVERTER

Filed May 26, 1958 6 Sheets-Sheet 3

INVENTORS:
Max Palevsky
Robert M. Beck
George J. Giel
By Smyth & Roston
Attorneys Feb. 12, 1963 M. PALEVSKY ETAL 3,077,303

DATA CONVERTER

Filed May 26, 1958 6 Sheets-Sheet 4

INVENTORS.
Max Palevsky
Robert M. Beck
George J. Giel
By Smyth & Roston
Attorneys

DATA CONVERTER

Filed May 26, 1958 6 Sheets-Sheet 5

INVENTORS:
Max Palevsky
Robert M. Beck
George J. Giel
By Smyth & Roston
Attorneys Feb. 12, 1963 M. PALEVSKY ETAL 3,077,303

DATA CONVERTER

Filed May 26, 1958 6 Sheets-Sheet 6

INVENTORS.
Max Palevsky
Robert M. Beck
George J. Giel
By Smyth & Roston
Attorneys United States Patent Office 3,077,303
Patented Feb. 12, 1963

3,077,303
DATA CONVERTER

Max Palevsky, Robert M. Beck, and George J. Giel, Los Angeles, Calif., assignors to Packard-Bell Computer Corporation, Los Angeles, Calif., a corporation of California Filed May 26, 1958, Ser. No. 737,697
22 Claims. (Cl. 235—154)

This invention relates to converters and more particularly to apparatus for providing a conversion between digital and analogue information. The invention is especially advantageous because it provides conversions at very high speeds and with accuracies considerably greater than those previously attained.

In recent years, considerable strides have been made in the development and production of equipment for performing computations and for providing controls in accordance with such computations. These developments have constituted considerable advances toward an age of automation. Some of these computers provide computations in digital form such that the values of a quantity are represented by individual pluralities of signals. Such equipments are known as "digital computers." Other computers operate on whole numbers so as to provide voltages having amplitudes directly proportional to the numbers. Such equipments are known as "analogue computers."

It is often necessary to provide a conversion between analogue and digital values in conjunction with the operation of such computers. For example, the operation of a digital computer may be controlled by certain measurements which may be made in analogue form such as by voltages having amplitudes representing the measurements. By way of illustration, measurements of temperature and humidity may be made and may be indicated by voltages having amplitudes directly proportional to the values of the temperature and humidity. The values of these quantities have to be introduced to the computer for combination in certain mathematical relationships to obtain a desired result. In order for the digital computer to use this information properly, the voltages have to be converted to a plurality of signals indicating the amplitude of the voltage in digital form.

After the computations by the digital computer have been made, it may be necessary to convert the output signals from the digital computer into an analogue form so as to provide certain controls over an operation requiring selected values of certain parameters for proper functioning. For example, the digital computer may perform computations involving mathematical relationships between the measurements of temperature and humidity to provide output signals indicating what the temperature and humidity should actually be. These output signals have to be converted into an analogue form so as to vary the operation of equipment in such a manner as to obtain the proper temperature and humidity.

Attempts have been made to provide converters which are so adaptable that they can convert either from an analogue form into a digital form or from a digital form into an analogue form. Certain problems have arisen in the development of these converters. One problem has been that the converters do not operate with at least the same accuracies and speed as the computers. For example, some converters have operated at the speeds of their associated computers but not with the accuracy of the associated computers while others have operated with the accuracies of their associated computers but not at the speed of the computers. This has been discouraging since all of the advantages of accurate and speedy computations are lost in the process of conversion.

This invention provides a converter which overcomes the above disadvantages. The converter provides conversions between digital and analogue quantities at a speed at least equal to the speed at which computations can be performed by computers. At the same time, the converter provides conversions between digital and analogue quantities with accuracies of an extremely high order and of an order considerably greater than that obtained by other converters. For example, the converter constituting this invention is able to provide conversions with an error of less than 0.002 percent.

The converter constituting this invention has other advantages. It provides conversions from digital to analogue quantities or from analogue to digital quantities without requiring any significant modifications in the converter between one type of use and the other. This can be considered as a major advantage since analogue-to-digital converters have to be used with digital computers at the input end of the computers and since digital-to-analogue converters have to be used with digital computers at the output end of the computers. The invention is also advantageous since it is able to provide a multiplication operation at the same time that it provides a conversion from a digital representation to an analogue representation. Furthermore, the converter is able to provide an operation of division at the same time that it provides a conversion from an analogue representation to a digital representation.

The converter constituting this invention operates on the principle of producing a fraction of a regulated voltage to provide a conversion between digital and analogue quantities. The production of this fraction of the regulated voltage is dependent upon the operation of a plurality of switches in either the first or second relationships of the switches. A plurality of resistances are also included in the converter and are connected to the switches such that a first terminal of each resistance is provided with a common connection and a second terminal of each resistance is connected to a different one of the switches.

In a first operative relationship of each switch, the second terminal of the associated resistance is connected to one terminal of the source of regulated voltage. Similarly, in a second operative relationship of each switch, the second terminal of the associated resistance is connected to the second terminal of the source of regulated voltage. In this way, different combinations of resistances are connected between the common terminal and the first terminal of the voltage source and between the common terminal and the second terminal of the voltage source in accordance with the individual pattern of operation of the switches in the first and second relationships. In this way, the voltage produced on the common terminal of the resistances is dependent upon the particular resistances having their second terminals connected to the first terminal of the voltage source and upon the particular resistances having their second terminal connected to the second terminal of the voltage source.

The resistances connected to the different switches are provided with values having a geometric relationship to one another. For example, when the conversion is provided between analogue quantities and quantities digitally represented by a binary code, the value of each resistance may have a 2:1 relationship to the value of another resistance in the plurality. In this way, each resistance and its associated switch provide a representation as to whether the value of a particular digital position has a binary value of "1" or "0." A binary "0" representation is obtained when the switch has a first operative relationship. Similarly, a binary "1" representation is obtained when the switch has a second operative relationship.

The converter constituting this invention is advantageous in that it provides switches which can act considerably faster than mechanical switches. These switches are provided by a novel arrangement of a plurality of semiconductors such as transistors. The transistors are connected so as to clamp the second terminal of the associated resistance directly to either the first terminal of the voltage source in a first operative relationship or to the second terminal of the voltage source in a second operative relationship. This clamping is obtained in such a manner that the impedance presented by the converter remains substantially constant regardless of the number and combinations of the resistances switched from a coupling with the first terminal of the voltage source to a coupling with the second terminal of the voltage source. By presenting a substantially constant impedance regardless of its operatin condition, a proper impedance match can be obtained at all times between the converter and its associated stages.

A novel feature of the invention is the inclusion of an additional resistance to increase the accuracy of conversion. This additional resistance is provided with a value equal substantially to the value of the largest resistance in the plurality mentioned in the previous paragraphs. The additional resistance is connected between the common terminal of the resistances in the plurality and the first terminal of the voltage source. The additional resistance prevents an error from being obtained in the potential which is produced at the common terminal of the resistances when digital signals representing a relatively large value are introduced to the converter.

As previously described, the converter constituting this invention is adapted to operate without any significant change either for a conversion from a digital to an analogue representation or from an analogue to a digital representation. When the converter operates to convert from a digital to an analogue representation, it receives a plurality of signals which control the operation of the different switches in the first and second relationships of these switches. As previously described, the operation of the switches in the first and second relationships controls the connections of the associated resistances to the first or second terminals of the voltage source. Because of this, the resistances become connected in individual parallel combinations between the common terminal and the first terminal of the voltage source and between the common terminal and the second terminal of the voltage source in accordance with the pattern of operation of the switches. The particular combinations of the resistances connected between the common terminal and the second terminal of the voltage source and the weighted values of these resistances control the particular fraction of the regulated voltage which is produced at the common terminal of the resistances. Regardless of the particular fraction of the weighted voltage which is produced at the common terminal of the resistances, the impedance presented by all of the resistances at the common terminal remains substantially constant.

Multiplication can be obtained by varying the amplitude of the regulated voltage from the voltage source. By varying the amplitude of the regulated voltage, corresponding variations can be provided in the value of a multiplier. The multiplicand can be considered as the analogue value of the digital signals introduced to the different switches in the converter. The product is represented directly as the voltage on the common output terminal of the resistances since this voltage is dependent both on the amplitude of the regulated voltage and upon the pattern of the digital signals introduced to the different switches.

The converter constituting this invention can also be included in a system which operates dynamically to obtain a conversion of an analogue quantity into a digital form. To obtain such a conversion, the converter is used in combination with other stages including a comparator. This comparator operates to compare the input potential representing the analogue quantity with the potential produced on the common terminals of the resistances. Adjustments are provided in the operation of the different switches in the converter in the first and second relationships in accordance with any differences between the input potential and the potential on the common terminal of the resistances. These adjustments in the operation of the different switches in the converter in the first and second relationships are made until the potential on the common output terminals of the resistances becomes equal to the input potential. At such time, the different switches in the converter have an individual pattern of operation which provides a digital representation of the input quantity.

The converter constituting this invention can also be included in the dynamic system set forth in the previous paragraph to determine the quotient between a dividend and a divisor. This results from the operation of the switches so that the fraction of the regulated voltage at the common terminal of the resistances is maintained equal to an input potential. Therefore, if the regulated potential is varied as a divisor and the input potential is varied as a dividend, the fraction of the regulated potential established at the common terminal of the resistances will vary as a quotient. By way of illustration, the pattern of operation of the different switches in the converter becomes varied in order to make the potential on the common terminal of the resistances equal to the input potential even with variations in the amplitude of the regulated voltage. Since the pattern of operation of the different switches becomes varied even for a constant dividend but a variable divisor, this tends to indicate that the potential on the common terminal of the resistances represents the quotient of the dividend and the divisor.

In addition to the novel concepts of conversion set forth above and to the concepts of multiplication and addition individual to the converter, the converter constituting this invention has other novel aspects. These novel aspects are inherent in the particular combinations of electrical stages which are included in the converter. For example, novel circuitry is provided in a counter which is used in combination with the converter to control the operation of the different switches in the converter and to provide an indication as to the individual pattern of operation of these switches. The construction and operation of this novel circuitry including the counter will be set forth in detail subsequently.

Figure 3:
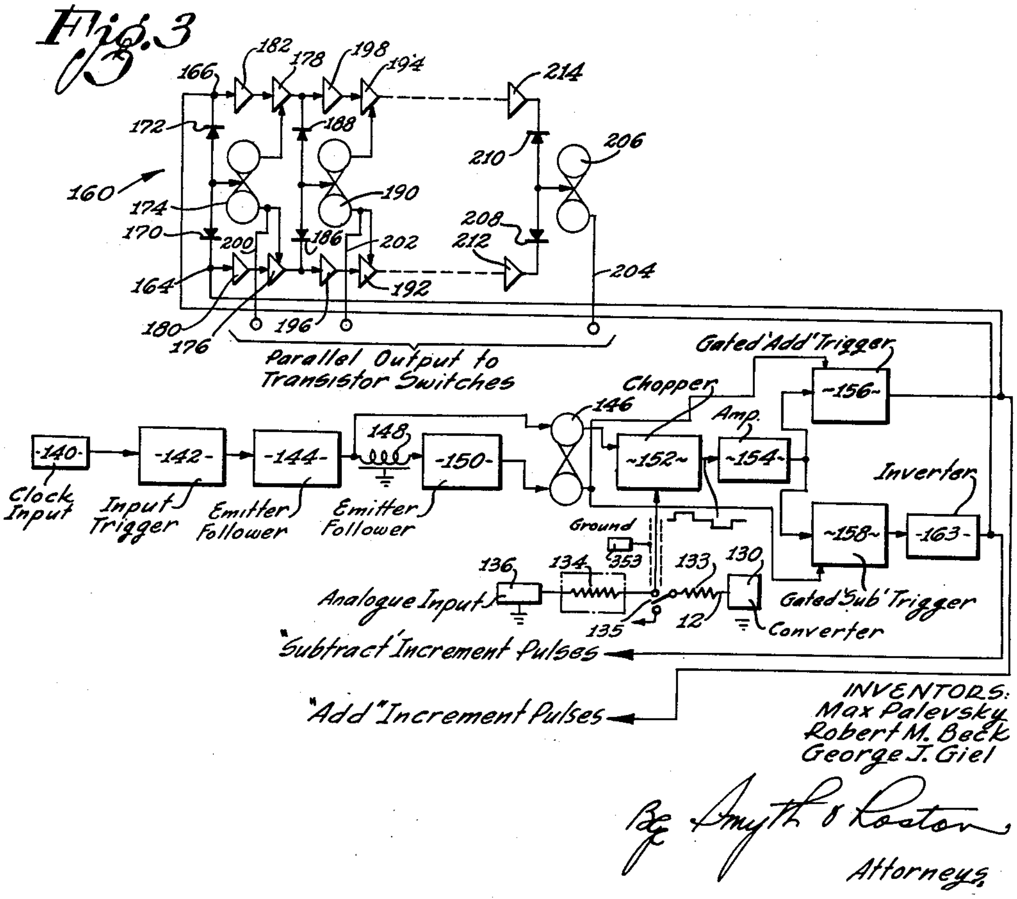
FIGURE 3 is a block diagram of a system including the converter shown in FIGURES 1 and 2 for operating on a dynamic basis to convert an analogue quantity represented by an input voltage into a plurality of signals digitally representing the value of the analogue quantity.
Figure 4A:
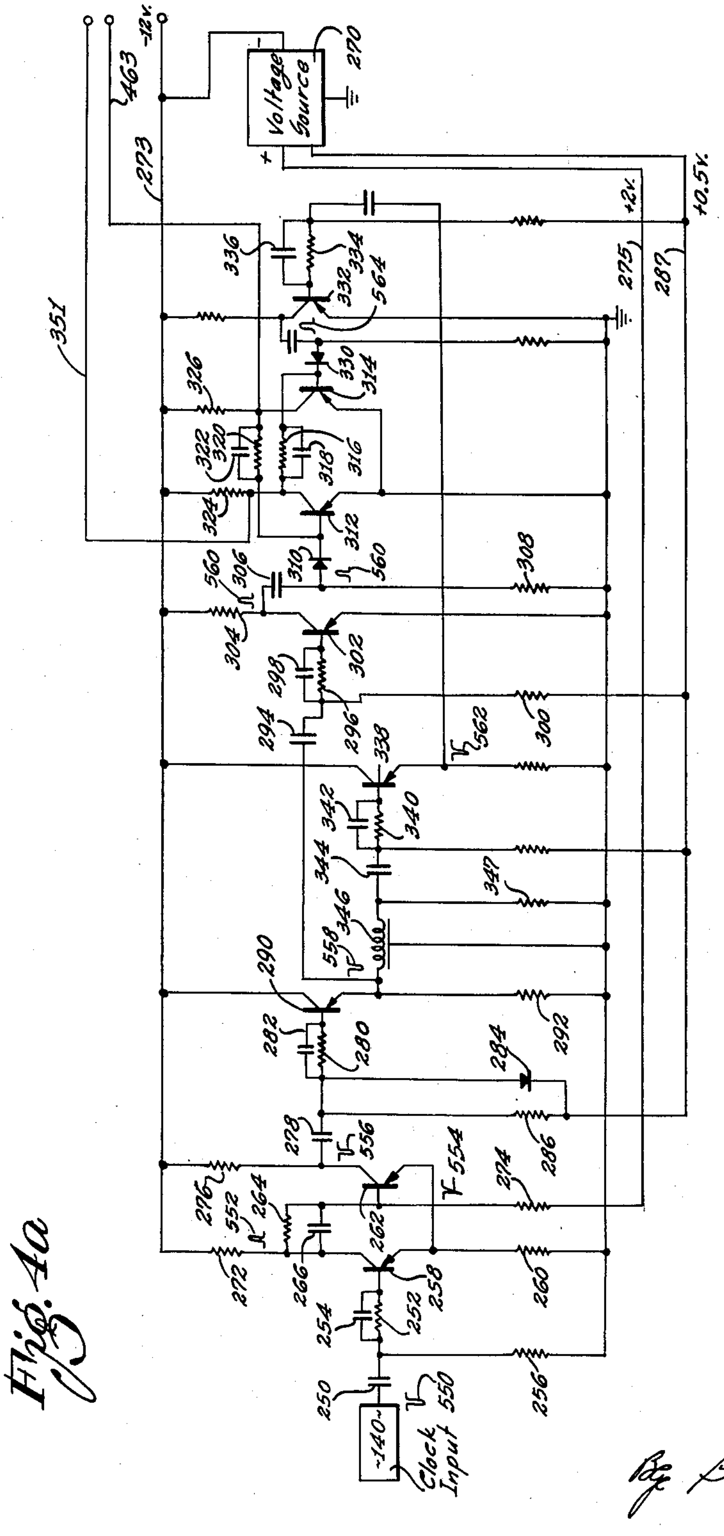
Figure 4B:
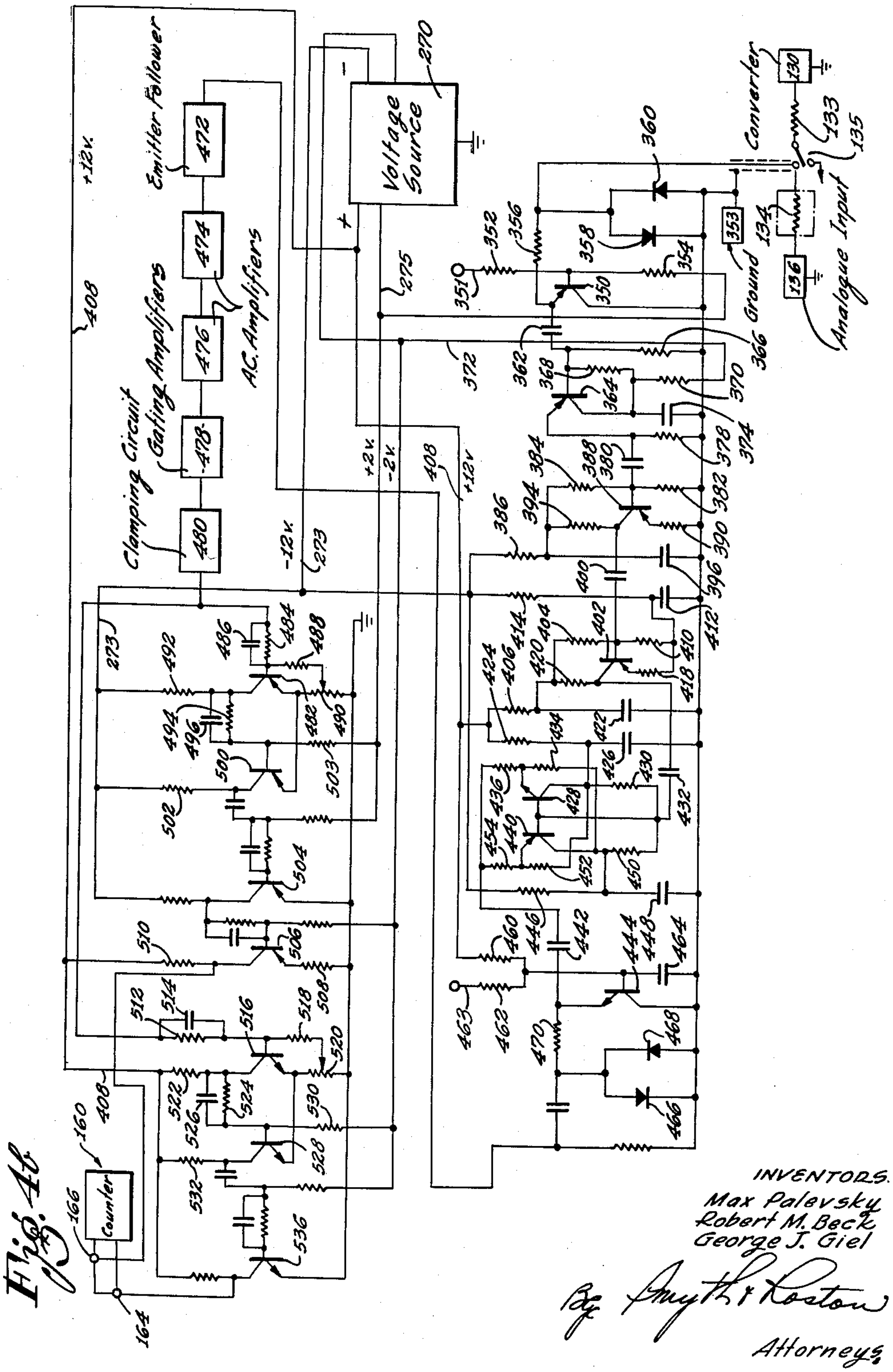
Figure 5:
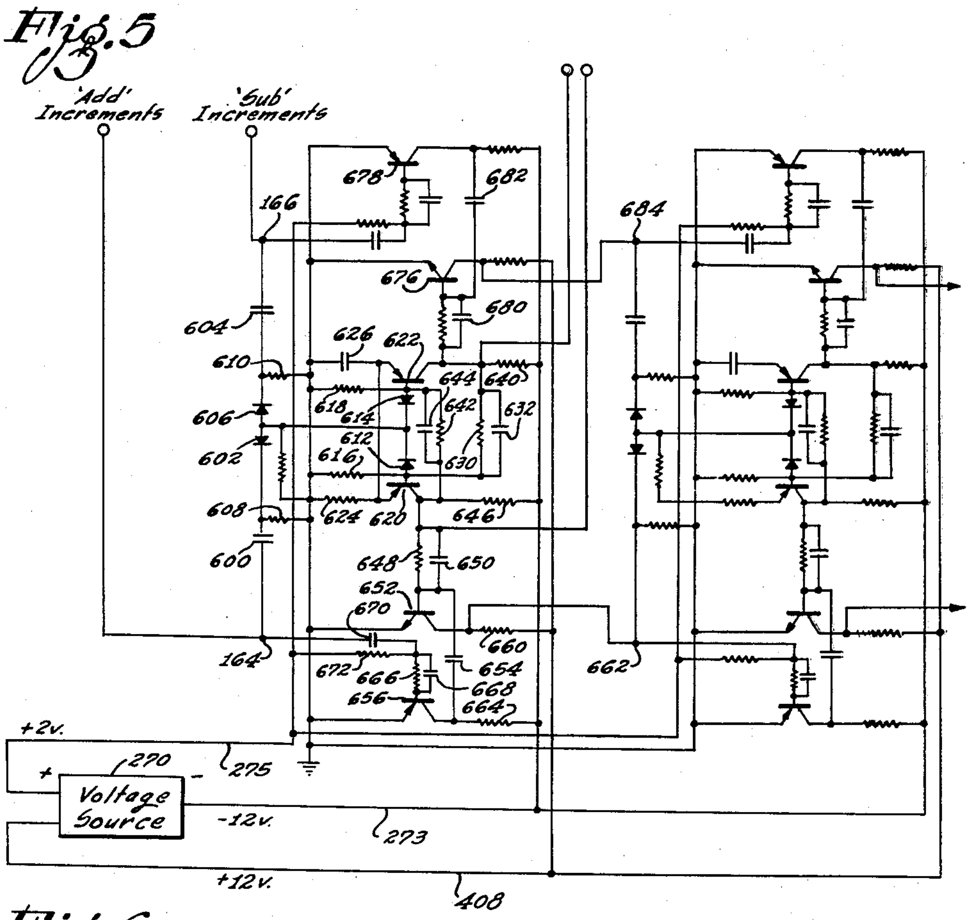
Figure 6:
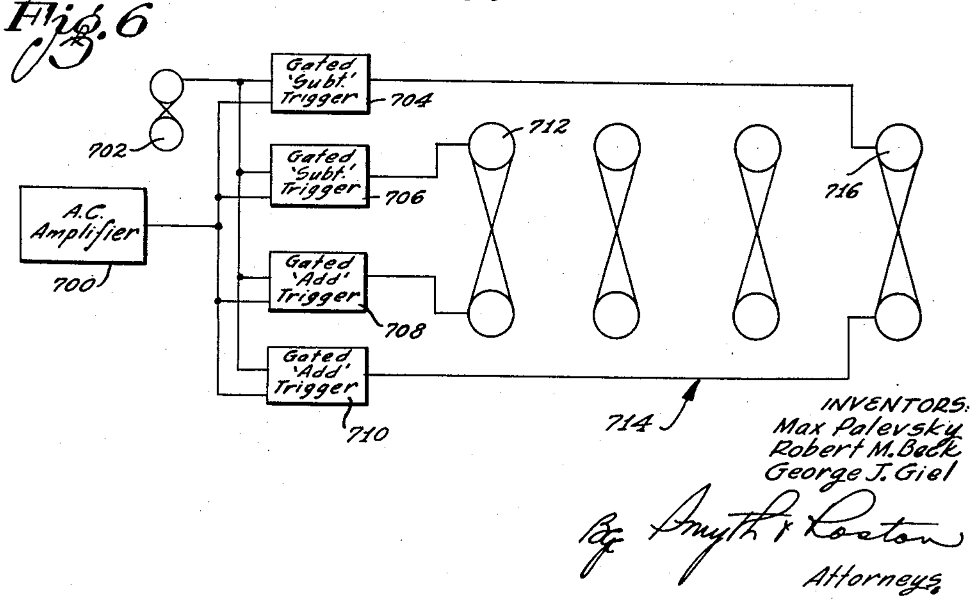
Figure 7:
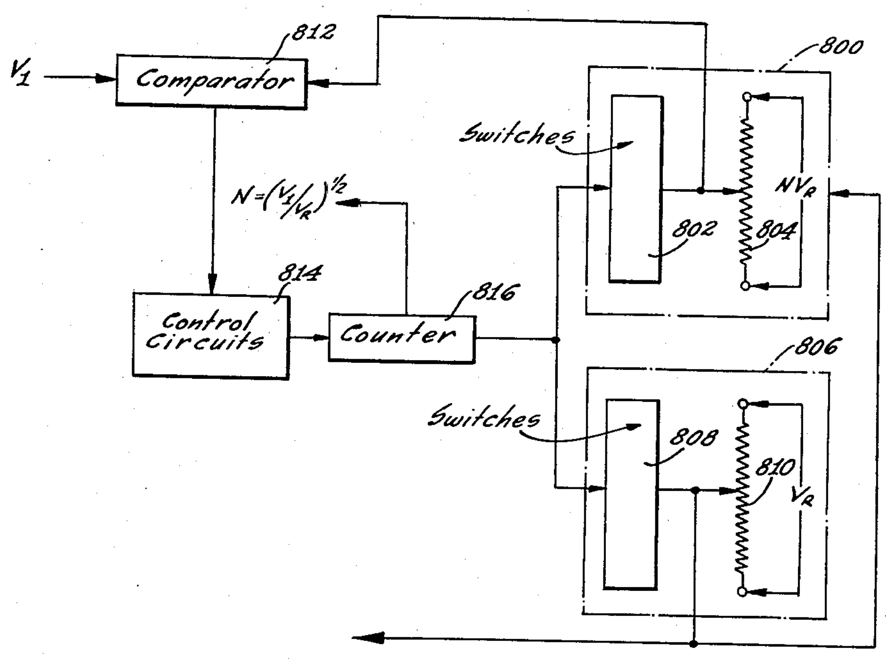

FIGURES 4*a* and 4*b* are circuit diagrams which illustrate in detail certain important portions of the system shown in block diagram in FIGURE 3;

FIGURE 5 is a circuit diagram illustrating in detail two stages of a counter included in the block diagram shown in FIGURE 3;

FIGURE 6 is a block diagram of a system constituting a modification of the system shown in FIGURE 3 for controlling the response of the system shown in FIGURE 3 in accordance with different amplitudes of error voltages produced by the system; and FIGURE 7 is a block diagram of a system using a pair of converters constituting the invention to perform a square-root operation on an analogue quantity and for indicating the resultant quantity in digital form.

Converter

Figure 1:
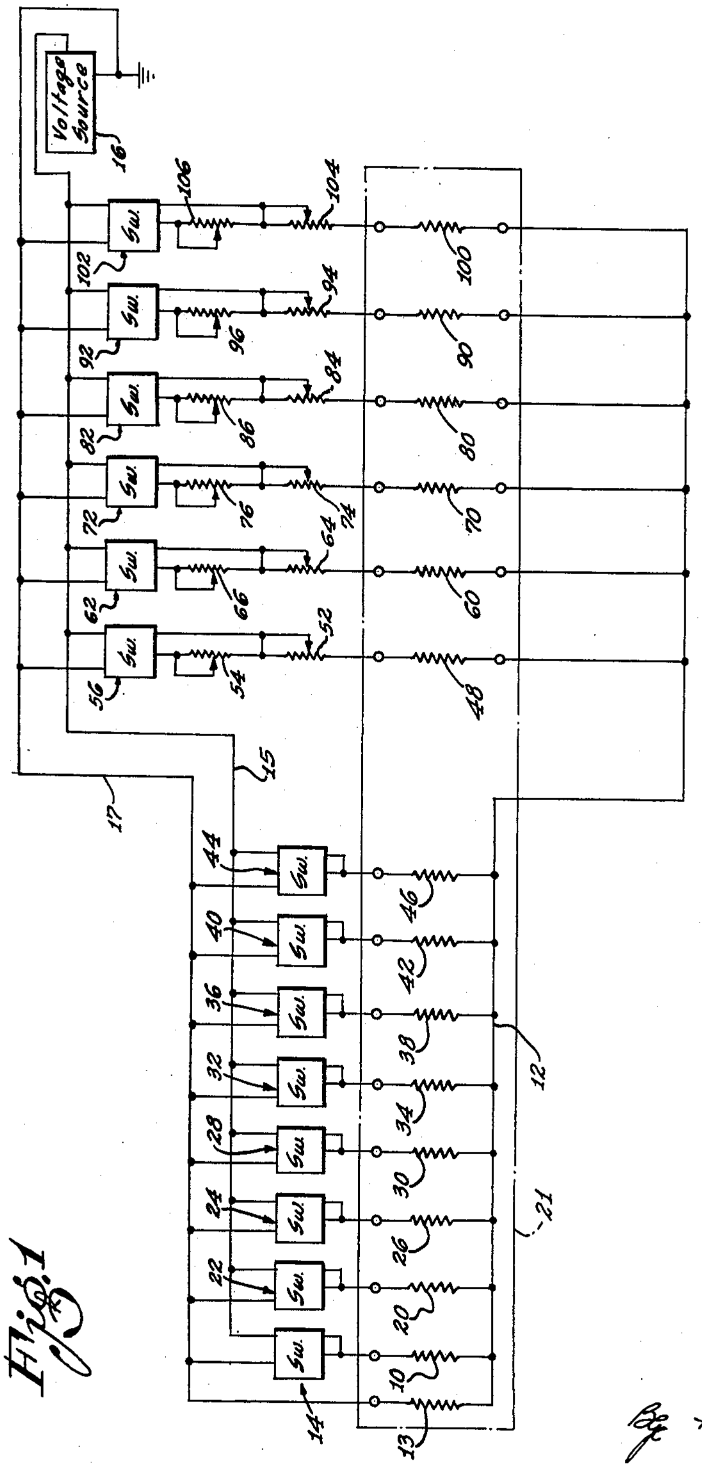
FIGURE 1 is a circuit diagram, partly in block form, of a converter constituting one embodiment of this invention and constructed to provide an accurate and rapid conversion from analogue to digital representations or from digital to analogue representations.

FIGURE 1 illustrates circuitry forming a part of the invention and includes a plurality of resistances connected in a network arrangement with a plurality of switches each having first and second operative relationships. For example, a resistance 10 having a suitable value such as substantially 40 megohms has a first terminal connected at a common line 12 with the other resistances in the network arrangement. A second terminal of the resistance 10 is connected to first and second output terminals of a switch schematically illustrated in block form at 14. The switch 14 may be constructed from a plurality of transistors connected in a novel arrangement to provide an extremely fast and accurate operation, as will be set forth in detail subsequently.

The switch 14 is provided with first and second input terminals. The first input terminal of the switch 14 is connected through a line 17 to the positive terminal of a voltage source 16. The potential on the positive terminal of the voltage source 16 may be considered as zero volts. The second input terminal of the switch 14 is connected through a line 15 to a negative terminal of the voltage source 16. As will be described in detail subsequently, the negative potential on the line 15 may be varied within certain limits such as 0 to −20 volts. A resistance 13 is connected between the lines 12 and 17 and is provided with a value substantially equal to that of the resistance 10 when the digital representation is provided in a binary code.

The voltage source 16 is constructed to provide a regulated voltage having a high stability even with considerable changes in such parameters as alternating line voltage, load impedance and ambient temperature. Such a voltage source may be purchased from the Redcor Development Corporation to provide a stability involving errors of less than 0.001 percent with substantial changes in external parameters. This stability is obtained along with a low internal impedance such as 0.01 ohms in the source.

A resistance 20 has a first terminal connected to the line 12 and has a second terminal connected to first and second output terminals of a switch 22 which may be constructed in a manner similar to the switch 14. The resistance 20 may be provided with a suitable value such as 20 megohms when the converter constituting this invention operates on signals digitally representing the value of a quantity in binary form. As will be seen, the value of the resistance 20 is one-half that of the resistance 10 to conform to the inverse ratio between the value of successive signals in a binary code. The resistances 10, 13 and 20 and all of the other resistances in the network arrangement may be purchased from the Julie Research Laboratories of New York City. The values of the resistances are carefully matched to obtain the 2:1 ratio between successive resistances and to obtain corresponding temperature coefficients for the different resistances. Bv matching the temperature coefficients of the different resistances in the matrix arrangement, errors cannot be produced in the conversion operation as a result of changes in ambient temperature. Furthermore, the ambient temperature of the resistances is maintained substantially constant by disposing the resistances in an oil bath, as indicated in FIGURE 1 by broken lines 21. This is important since a slight difference in the temperature coefficient between successive resistances may produce a considerable variation of these resistances upon the occurrence of temperature changes in the resistances.

The switch 22 is provided with first and second input terminals which are respectively connected to the lines 17 and 15 extending from the voltage source 16. A switch 24 may be constructed in a manner similar to the switches 14 and 22 so as to be provided with two output terminals and two input terminals. The output terminals of the switch 24 are connected to one terminal of a precision resistance 26, the other terminal of which is connected to the line 12. The resistance 26 may be provided with a suitable value such as substantially 10 megohms to have a 1:2 relationship to the resistance 20 when the converter operates on digital signals having a binary code. In like manner, successive branches are formed by a switch 28 and a resistance 30, a switch 32 and a resistance 34, a switch 36 and a resistance 38, a switch 40 and a resistance 42 and a switch 44 and a resistance 46. The resistances 30, 34, 38, 42 and 46 may be respectively provided with suitable values such as 5 megohms, 2.5 megohms, 1.25 megohms, 0.625 megohms and 0.3125 megohms.

As will be seen from the previous and subsequent discussions, the branches including the resistances 10, 20, 26, 30, 34, 38, 42 and 46 provide indications as to the first eight digits of least significance in a digital representation. For successive digits of progressive significance, resistances in addition to the precision resistances are included in the branches to provide fine adjustments for obtaining the proper impedance values for these branches. For example, a precision resistance 48 is included in the branch of ninth least significance and is provided with a suitable value such as substantially 156 kilo-ohms. A first terminal of the resistance 48 is connected to the line 12 and a second terminal of the resistance 48 is connected to the first terminal of a rheostat 52. The rheostat 52 may be provided with a suitable value such as 500 ohms. The rheostat 52 need not be provided with precision value nor with low temperature cofficient as does the resistance 48. This results from the fact that the rheostat 52 contributes relatively little to the total impedance of the branch which includes the resistance 48.

The second terminal of the rheostat 52 is connected to the first terminal of a rheostat 54 having a suitable value such as approximately 5 ohms. Connections are made from the movable contact of the rheostat 52 to the second terminal of the rheostat 54 and to a first output terminal of a switch 56 corresponding to the switch 14. The second output terminal of the switch 56 has a common connection with the second terminal and the movable contact of the rheostat 54. The switch 56 is provided with first and second input terminals which are respectively connected to the lines 17 and 15.

Successive branches are connected in a manner similar to that described above for the branch including the resistance 48 and the switch 56. For example, a resistance 60, a switch 62 and rheostats 64 and 66 are connected to form a branch providing an indication as to the digit of tenth least significance in a binary code. The resistance 60 and the rheostats 64 and 66 are respectively provided with suitable values such as substantially 78 kilo-ohms, 250 ohms and 5 ohms. The resistance 60 is a precision resistance but the rheostats 64 and 66 do not have to provide precision values.

A precision resistance 70 is connected in a branch with a switch 72 and rheostats 74 and 76. The resistance 70 and the rheostats 74 and 76, respectively have suitable values such as 39 kilo-ohms, 125 ohms and 5 ohms. Similarly, a resistance 80, a switch 82, rheostats 84 and 86 and a resistance 88 are electrically disposed in a separate branch. The resistance 80 is of the precision type and is provided with a suitable value such as 19.5 kilo-ohms. The rheostats 84 and 86 are respectively provided with suitable values such as approximately 62 ohms and 5 ohms.

A precision resistance 90, a switch 92 and rheostats 94 and 96 are electrically disposed in a branch of second highest significance. The resistance 90 and the rheostats 94 and 96 are respectively provided with suitable values such as 9.75 kilo-ohms, 31 ohms and 5 ohms. A branch of highest significance is formed by a precision resistance 100, a switch 102 and rheostats 104 and 106. The resistance 100 and the rheostats 104 and 106 may be respectively provided with suitable values such as 4.875 kilo-ohms, 15 ohms and 5 ohms.

Figure 2:
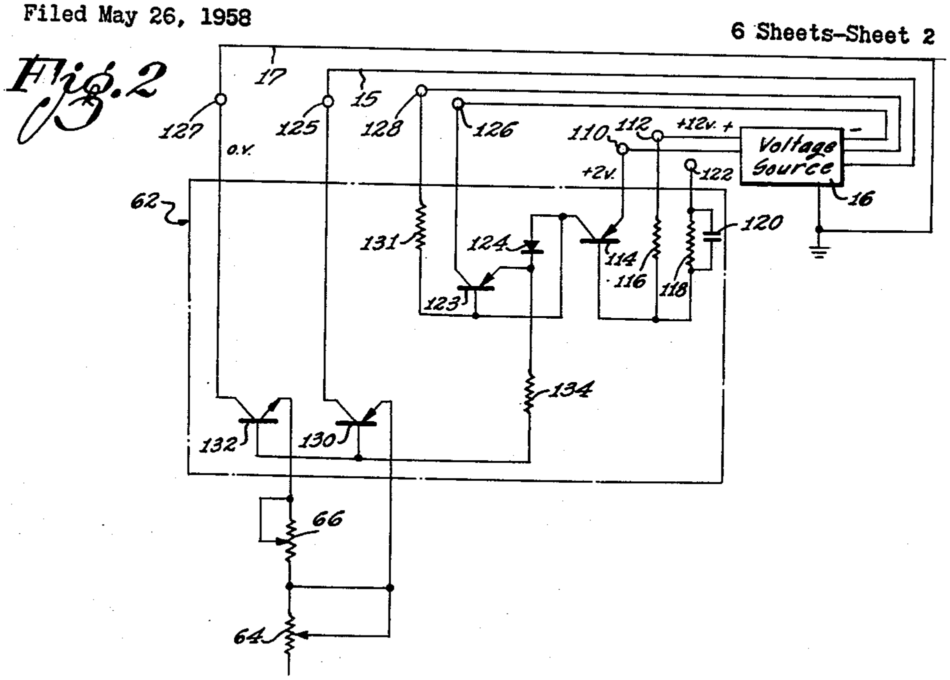
FIGURE 2 is a circuit diagram illustrating in detail the construction of one of the switches shown in block form in FIGURE 1.

Since each of the switches 14, 22, 24, 28, 32, 36, 40, 44, 56, 62, 72, 82, 92 and 102 may be constructed in a similar manner, only one of the switches will be described in detail. For this reason, only the switch 62 is shown in FIGURE 2 and will be described in detail in this application. The switch 62 has a pair of input terminals 110 and 112 connected to the voltage source 16 to receive suitable values of fixed amplitudes. For example, the terminals 110 and 112 may respectively have potentials of +2 volts and +12 volts applied to them from the voltage source.

The terminal 110 is connected to the emitter of a suitable semi-conductor such as a transistor 114, which may be a Type 2N247. A resistance 116 having a suitable value such as approximately 8.2 kilo-ohms is connected between the terminal 112 and the base of the transistor 114. A parallel combination of a resistance 118 and a capacitance 120 is connected between the base of the transistor 114 and an input terminal 122. The resistance 118 and the capacitance 120 may be respectively provided with suitable values such as approximately 3.9 kilo-ohms and 200 micro-microfarads.

The collector of the transistor 114 is connected to the base of a suitable semi-conductor such as a transistor 123, which may also be a Type 2N247. Connections are also made from the collector of the transistor 114 to the anode of a diode 124 and from the emitter of the transistor 123 to the cathode of the diode. The collector of the transistor 123 has a suitable negative potential applied to it from a terminal 126 in the voltage source 16. This potential is adapted to vary in accordance wtih variations in the potential applied to the line 15 in FIGURE 1. For example, the terminal 126 may have a suitable value such as —22 volts when the potential in the line 15 is —20 volts. Similarly, the potential at the terminal 126 may be —13 volts when a potential of —11 volts is applied to the line 15 such that a difference of 2 volts is always produced between the potentials on the terminal 126 and the line 15.

A terminal 128 is also connected to the voltage source 16 to reecive a potential 2 volts more negative than that applied to the terminal 126 just as the terminal 126 receives a potential 2 volts more negative than that applied to the line 17. A resistance 131 has common connections with the terminal 128 and the base of the transistor 123. The resistance 131 may be provided with a suitable value such as approximately 10 kilo-ohms.

The bases of suitable semi-conductors such as transistors 130 and 132 receive the potential on the emitter of the transistor 123 through a resistance 134 having a suitable value such as approximately 470 ohms. The transistors 130 and 132 may be respectively Types TI302 and 2N184, the former being of the PNP variety and the latter being of the NPN variety. The collectors of the transistors 130 and 132 are respectively connected at terminals 125 and 127 (FIGURE 2) to the lines 15 and 17 in FIGURE 1. The emitters of the transistors 130 and 132 respectively have common connections with the movable contacts of the rheostats 64 and 66.

The switches such as the switch 14 control whether the associated resistance such as the resistance 10 is connected between the lines 12 and 17 or between the lines 12 and 15. In one operative relationship of the switch 14, for example, the resistance 10 becomes connected between the lines 12 and 17. In a second operative relationship of the switch 14, the resistance 10 becomes connected between the lines 12 and 15. Normally, all of the switches such as the switch 14 are in the first operative relationship so as to be connected between the lines 12 and 17. Since the resistance 13 is also connected between the lines 12 and 17, an open circuit is produced between the lines 12 and 15. Because of the open circuit between the lines 12 and 15, no voltage is developed across the lines 12 and 17. This causes a potential of zero volts equal to that on the line 17 to be produced on the line 12 and corresponds to an analogue value of zero.

The potential produced on the line 12 changes in a pattern dependent upon adjustments in the operation of the different switches from their first relationships to their second relationships. For example, the switch 14 may change from the first relationship to the second relationship. This causes the resistance 10 to be electrically connected between the lines 12 and 15 whereas all of the other resistances remain connected in parallel between the lines 12 and 17.

Because of the parallel relationship between all of the precision resistances other than the resistance 10, the impedance presented between the lines 12 and 17 is relatively low in comparison to the impedance presented by the resistance 10 between the lines 12 and 15. This causes most of the potential drop of the regulated voltage from the source 16 to occur across the resistance 10 such that a negative voltage slightly below ground is produced on the line 12. This negative voltage has an amplitude corresponding to an analogue value of "1." An analogue value of "1" is produced when only the switch 14 changes from its first operative relationship to its second operative relationship.

For an analogue value of "2," the switch 14 returns to its first operative relationship and the switch 22 becomes disposed in its second operative relationship. This causes an impedance of 20 megohms rather than 40 megohms to be produced between the lines 12 and 15. The impedance produced between lines 12 and 17 corresponds substantially to the same impedance as that produced across the lines for an analogue value of "1." Since the impedance between the lines 12 and 15 for an analogue value of "2" is one-half that for an analogue value of "1," the amplitude of the negative voltage produced on the line 12 for an analogue value of "2" is substantially twice as great as the voltage produced on the line 12 for an analogue value of "1."

Both of the switches 14 and 22 become operative in their second relationships for an analogue value of "3." This causes the resistances 10 and 20 to become connected in parallel between the lines 12 and 15. By an application of Kirchoff's laws, the value of the resistances 10 and 20 in parallel becomes substantially 6⅔ megohms. Since this value is substantially one-third that of the resistance 10, the line 12 has produced on it a potential which is substantially three times as great as that representing an analogue value of "1."

In like manner, it can be shown that the potential on the line 12 has a negative amplitude which is directly proportional to the analogue value represented by the digital signals controlling the operation of the different switches. This direct proportion between the potential on the line 12 and the analogue value represented by the digital signals exists even for high analogue values. For example, the converter shown in FIGURE 1 has fourteen separate branches each representing the value of a binary digit of progressively increasing importance. When each of the fourteen binary digits has a binary value of "1," a maximum analogue value of "16,383" would be produced. By including the resistance 13, this value can be properly represented by the output potential in the line 12. For a binary value of "1" for each of the fourteen digital positions, all of the switches shown in FIGURE 1 are in their second operative relationship. This places all of the precision resistances except the resistance 13 in parallel between the lines 12 and 15. Because of this, only the precision resistance 13 appears between the lines 12 and 17. Since all of the precision resistances except the resistance 13 are in parallel, their resultant value is relatively low in comparison to that provided by the resistance 13. This causes the amplitude of the negative voltage on the line 12 to approach the negative potential on the line 15 but to be slightly less than this negative potential.

Because of the inclusion of the resistance 13, the potential on the line 12 can never equal the negative potential on the line 15. The maximum value produced on the line 12 corresponds to a binary value of "1" for each of the fourteen digital positions in the converter. If the resistance 13 were not included, the maximum potential on the line 12 would equal the negative potential on the line 17. This would correspond to a binary value of "0" for each of the first fourteen digital positions and a binary value of "1" for the fifteenth digital position. In this way, an error of "1" would be produced at the upper limits since a binary value of "0" for each of the first fourteen positions and a value of "1" for the fifteenth digital position corresponds to the addition of a binary value of "1" in the least significant digit position to a value represented by binary indications of "1" in each of the first fourteen positions.

For a converter having fourteen branches such as that shown in FIGURE 1, a deviation of "1" in the least significant digit would involve an error of almost 0.1 percent (0.1%). This is a considerable error in relation to the relatively low errors produced by digital computers which have been built and which now are in operation. For this reason, the inclusion of the resistance 13 in the converter provides a considerable enhancement in the accuracies which are obtained. This considerable enhancement is especially effective for the conversion of a high digital value to a corresponding analogue representation or for the conversion of a high analogue value to a corresponding digital representation.

As will be seen from the above discussion, the converter shown in FIGURE 1 operates to convert a digital representation into an analogue representation by producing on the line 12 a potential having an amplitude directly proportionate to the analogue representation. This potential has a particular fractional relationship to the potential on the line 15 to provide a direct indication of the analogue value. Because of this fractional relationship, the potential on the line 12 can be considered to represent a multiplication between the potential on the line 17 and the value of the digital input signals. A true multiplication between two numbers can be obtained by varying the potential on the line 17 to represent one of the numbers and by varying the pattern of the digital input signals to represent the other number.

It will be seen that only the precision resistances are included in the eight branches of least significance whereas resistances and rheostats in addition to the precision resistances are included in the six branches of greatest significance. This results from the fact that the precision resistances in the branches of least significance have relatively high values. These values are so much greater than the impedance provided by the switches included in the branches that differences in the impedance presented by the individual switches have a negligible effect on the over-all accuracy of the converter. However, differences in the impedance provided by the individual switches in the branches of greatest significance can produce some error in the operation of the converter if these variations are not properly compensated. Such compensations are obtained by trimming the different rheostats in the branches of greatest digital significance to obtain an optimum impedance in accordance with the individual impedances presented by the different switches.

As previously described, each switch such as the switch 62 is formed from a plurality of transistors connected in a novel arrangement. These transistors have variations in their saturation impedances, the variations resulting from inability to manufacture transistors within precise tolerances. The transistors having the high impedances are connected in the line which would include only one of the rheostats and not both of the rheostats. For example, the transistors having relatively high impedances in the switch 62 are connected in the line with the rheostat 64 and the resistance 60, and the rheostat 64 is trimmed to obtain the proper impedance in the line. After the rheostat 64 is trimmed, the rheostat 66 is trimmed to obtain the proper impedance in the line formed by the resistance 60, the rheostats 64 and 66 and the transistors of relatively low impedance in the switch 62. In this way, the branch including the resistance 60 and the switch 62 has the same impedance regardless of whether the switch is operating in the first relationship or in the second relationship.

The rheostats in each branch are trimmed by comparing the impedance in that branch with the combined impedance in all of the branches of decreased significance. At the same time, all of the branches of greater significance than the tested branch are uncoupled from line 12. For example, the branch including the switch 62 and the precision resistance 60 would have its impedance compared with the resultant impedance in the first nine branches of least significance to obtain a proper trimming of the rheostats 64 and 66. However, the four branches of greatest significance would be disconnected from line 12 at this time.

In order to test for the proper impedance in the branch including the switch 62 and the precision resistance 60, a single-pole double-throw switch is alternately operated to connect the tested branch to a source of voltage and then to connect the parallel combination of all of the preceding branches to the source of voltage. A comparison is made between the voltage produced across a test impedance by the branch being tested and by the parallel combination of the impedances in all of the preceding branches. Adjustments are made until the voltages across the test impedance become equal for both throws of the switch.

Each of the switches in the different branches of the converter such as the switch 62 has an input voltage applied to it to represent a binary "1" or a binary "0." The input voltage applied to the switch at the input terminal such as the terminal 122 in FIGURE 2 has a binary value of "1" when it has a potential of substantially zero volts. Similarly the input voltage at the terminal 122 has a binary value of "0" when it has a potential of substantially —10 volts.

As previously described, approximately +12 volts is applied to the terminal 112. This potential and the divider network formed by the resistances 118 and 116 control the potential applied to the base of the transistor 114 from the terminal 122. Since the transistor 114 is a PNP type, an axcess of positive ions exists in the region near the emitter. Because of this, the positive ions at the emitter are not able to travel toward the base and past the base to the collector when the potential at the base of the transistor is more positive than the potential at the emitter. This occurs when an input potential of zero volts is introduced to the input terminal 122 to represent a binary value of "1." Since no current is able to flow through the transistor 114, a potential approaching the potential at the terminal 128 is produced on the collector of the transistor.

The negative potential produced on the collector of the transistor 114 also appears on the base of the transistor 123 and on an approximate basis on the emitter of the transistor. Actually, the potential on the base of the transistor becomes more negative than the potential on the emitter of the transistor because of the operation of the resistance 130. The diode 124 allows the potential on the base of the transistor 123 to be more negative than the potential on the emitter since it provides a high back impedance under such circumstances. When the potential on the base of the transistor 123 becomes more negative than the potential on the emitter of the transistor, the transistor becomes conductive such that the potential on the emitter approaches that on the collector. This potential is introduced to the bases of the transistors 130 and 132 through the resistance 134.

Since the potential at the terminal 126 is approximately two volts more negative than the potential introduced to the collector of the transistor 130, the transistor 130 becomes conductive. This results from the fact that the collector of the transistor 130 in effect functions as the emitter of the transistor and from the fact that the emitter actually functions as the collector. The current flow through the transistor 130 is fairly heavy with most of the flow occurring from the collector to the base and with some of the flow occurring from the emitter to the base. By providing a heavy flow of current to the base from the collector and some flow of current to the base from the emitter, the emitter potential becomes clamped directly to the potential applied to the terminal 125. As previously described, this potential has a regulated value since it corresponds to the potential applied to the line 15 in FIGURE 1.

In this way, the regulated potential of the desired amplitude is applied to the movable contact of the rheostat 64 in FIGURES 1 and 2. The operation of the transistor 130 in providing a switch action by obtaining a flow of current to the base from both the emitter and the collector is fully set forth in an article entitled "Junction Transistors Used As Switches" and written by R. L. Bright and appearing in the March, 1955, issue of "Communication and Electronics."

At certain times, the input signal at the terminal 122 may be substantially —10 volts to represent a binary value of "0." When this signal is introduced to the base of the transistor 114 through the resistance 118, it causes the transistor to become conductive. The resultant flow of current through the transistor causes the potential on the collector of the transistor to have a value approximating the potential of +2 volts applied to the emitter of the transistor. This potential is applied to the base of the transistor 123 to render the transistor non-conductive. The diode 124 conducts so as to make the potential on the emitter of the transistor 123 correspond substantially to the potential on the collector of the transistor 114.

The positive potential of +2 volts produced on the emitter of the transistor 123 is applied to the bases of the transistors 130 and 132 through the resistance 134. This potential renders the transistor 130 non-conductive but operates to produce a flow of current through the transistor 132. This flow of current is produced because the collector of the transistor 132 in effect serves as the emitter. The collector of the transistor 132 is provided with a plurality of electrons which are attracted toward the base when the potential on the base becomes positive relative to the potential on the collector. This occurs when the base of the transistor 132 receives a potential of +2 volts.

The positive current flowing from the base of the transistor 132 to the collector of the transistor has a relatively large amplitude. Positive current having a somewhat reduced amplitude also flows from the base of the transistor 132 to the emitter of the transistor. This causes the potential on the emitter of the transistor 132 to become clamped directly to the regulated potential applied to the terminal 127 in FIGURE 2. This potential corresponds to that applied to the line 17 in FIGURE 1. In this way, a regulated potential having the desired value is applied to the movable contact of the rheostat 66 when the transistor 132 becomes conductive.

The switch shown in FIGURE 2 and described above has certain important advantages. It is able to operate at speeds considerably in excess of those which can be produced by mechanical switches. For example the switch shown in FIGURE 2 can operate at speeds approximately 5000 times faster than speeds which can be obtained from mechanical switches.

The switch shown in FIGURE 2 also has other advantages. It provides a balanced operation in the first and second relationships because of the inclusion of the transistors 114 and 123 to serve as an amplifier and emitter follower for transistors 132 and 130. This causes the base current presented to the transistor 130 during the conductance of the transistor to be substantially equal to the base current presented to the transistor 132 during the conductance of that transistor. This balanced source of base current drive is instrumental in producing an optimum operation of the transistors 130 and 132 in clamping the base of the conductive transmitter directly to the collector of the transmitter. The optimum clamping action is also obtained because of the unusual action of the transistors in producing a large flow of current between the base and collector of the transistor while there is a small flow of current between the base and emitter of the transistor. This direct clamping is important in obtaining the proper contribution of potential by the precision resistance in the associated branch toward the production of the required output potential on the line 12.

As previously described, the converter shown in FIGURES 1 and 2 preferably operates on a binary basis. In such an operation, each of the resistances 10, 20, 26, etc., in FIGURE 1 has a value twice as great as the previous resistance. For example, the resistances 10, 20, 26, 30, 34, 38, 42 and 46 may respectively have values of 40, 20, 10, 5, 2.5, 2.5, 1.25, 0.625 and 0.3125 megohms. However, the converter may also operate to provide conversions into or from other number systems than binary. For example, the converter may convert between an analogue representation and a binary-coded decimal representation where each decimal digit is represented by four binary numbers. These four binary numbers may in one embodiment have weighted values of 8, 4, 2 and 1. Under such circumstances, the resistances 10, 20, 26, 30, 34, 38, 42 and 46 may respectively have values of 40, 20, 10, 5, 4, 2, 1 and 0.5 megohms. A binary-coded decimal representation may also be provided for each decimal digit by four binary digits having weighted values of 4, 2, 2 and 1. For such weighted values, the resistances 10, 20, 26, 30, 34, 38, 42 and 46 may respectively have values of 4, 20, 20, 10, 4, 2, 2, and 1 megohms.

*Block Diagram of System Including Converter*

The converter shown in FIGURES 1 and 2 and described above is adapted to be used in a system which is shown in block form in FIGURE 3 and which is considered to be a part of this invention. In the system shown in FIGURE 3, the converter constituting this invention is indicated schematically in block form at 130. As previously described, the impedance presented by the converter at the output line 12 is substantially constant regardless of the pattern of operation of the different switches in the converter. The substantially constant impedance presented by the converter at the line 12 is indicated schematically by a resistance 133, which may have a value of substantially 2441.4 ohms for the values set forth above for the different resistances shown in FIGURE 1. In this way, the effective output voltage of the converter 130 acts as though it is applied through the line 12 to one terminal of the resistance 133.

The second terminal of the schematic resistance 133 is shown as having a common connection with the movable contact of a single-pole, double-throw switch 135, the upper stationary contact of which has a common connection with one terminal of a resistance 134. The resistance 134 may be provided with a value substantially equal to that of the resistance 133. The other terminal of the resistance 134 is connected to a source 136 for providing an input voltage. This input voltage is provided when a conversion is made from an analogue value represented by the voltage to a digital representation. When an analogue-to-digital conversion is provided, the movable contact of the switch 135 is moved into engagement with the upper stationary contact of the switch in FIGURE 3. For a digital-to-analogue conversion, the movable contact of the switch 135 is moved into engagement with the lower stationary contact of the switch in FIGURE 3.

The system shown in FIGURE 3 also includes a source 140 for producing clock signals at periodic intervals. Although the source 140 is shown in block form in FIGURES 3 and 4, its construction is believed to be apparent to a person skilled in the art. For example, the clock source may be a blocking oscillator or a monostable multivibrator. The output signals from the clock source 140 are introduced to the input terminal of a triggering stage 142, the output terminal of which is connected to an emitter follower 144. The signals from the emitter follower 144 pass directly to one input terminal of a flip-flop 146 and through a delay line 148 and an emitter follower 150 to a second input terminal of the flip-flop 146. The two input terminals of the flip-flop 146 may be designated as the upper and lower input terminals to correspond with the showing in FIGURE 3.

The flip-flop 146 is also provided with first and second output terminals which may be designated as the upper and lower terminals to correspond with the showing in FIGURE 3. The output signals from the upper output terminal of the flip-flop 146 are introduced to a chopper 152, which also receives the potential from the terminal common to the resistances 133 and 134. The chopper 152 produces signals having polarities related to the polarity of the voltage at the common terminal between the resistances 133 and 134 and produces these signals at times controlled by the operation of the flip-flop 146. These signals are introduced to an amplifier 154, and the amplified signals are introduced to a pair of triggering circuits 156 and 158, the operation of which is controlled by the potential on the upper output terminal of the flip-flop 146. The signals from the triggering circuit 156 are applied to a first input terminal 162 of a counter generally indicated at 160, and the signals from the triggering circuit 158 are applied through an inverter 163 to a second input terminal 164 of the counter.

The counter 160 is provided with a number of stages corresponding to the number of branches in the converter shown in FIGURE 1. Each stage in the counter includes a bistable stage such as a flip-flop for controlling the operation of the switch in an associated branch of the converter shown in FIGURE 1. The output from the flip-flop is applied through a suitable lead to the input terminal of the associated switch such as the input terminal 122 in FIGURE 2. Only a few stages of the counter 160 are shown in FIGURE 3 since it is believed that a person skilled in the art will completely understand the construction and operation of the counter from these stages.

The cathodes of diodes 170 and 172 are respectively connected to the terminals 164 and 166, and the plates of the diodes are connected to the input terminal of a flip-flop 174. As will be described in detail subsequently, the flip-flop 174 operates in a manner similar to the flip-flop 146 except that it receives signals at an input terminal common to the two stages of the flip-flop instead of receiving signals at two separate input terminals. The signals produced on the upper and lower output terminals of the flip-flop 174 are introduced respectively to input terminals of amplifiers 176 and 178. The amplifiers 176 and 178 also have second input terminals respectively connected to output terminals of amplifiers 180 and 182. The amplifiers 180 and 182 respectively receive the input signals applied to the terminals 164 and 166.

The output signals passing through the amplifiers 178 and 180 are respectively introduced to the cathodes of diodes 186 and 188 in a second stage of the counter. The plates of the diodes 186 and 188 are connected to the input terminal of a flip-flop 190 corresponding to the flip-flop 174. Connections are made from the lower and upper terminals of the flip-flop 190 to input tedminals of the amplifiers 192 and 194 having second input terminals respectively connected to the output terminals of amplifiers 196 and 198. The amplifiers 196 and 198 receive the signals respectively passing through the amplifiers 176 and 178.

Lines 200 and 202 respectively extend from the lower output terminals of the flip-flops 174 and 190. These lines extend to input terminals of the switches in associated stages such as the input terminal 122 in the stage shown in FIGURE 2. Similarly, a line 204 extends from the lower output terminal of a flip-flop 206 in the last stage of the counter 202 to an input terminal of the switch 102 in FIGURE 1 corresponding to the input terminal 122 shown in FIGURE 2. The flip-flop 206 receives input signals from the plates of diodes 208 and 210. The cathodes of the diodes 208 and 210 have signals applied to them from output terminals of amplifiers 212 and 214 in the previous stage. The amplifiers 212 and 214 respectively correspond to the amplifiers 176 and 178 in the first stage of the counter.

To obtain a conversion from a digital representation to an analogue represenation, all of the flip-flops in the counter 160 such as the flip-flops 174, 190 and 206 are initially set to a particular state of operation. For example, all of the flip-flops may be set to an operation wherein a relatively high positive voltage is produced on the upper output terminal of the flip-flop and a relatively low voltage is produced on the lower output terminal of the flip-flop. This corresponds to an analogue value of "0," Digital signals are then introduced to the different flip-flops in the counter in accordance with the individual pattern representing the particular value to be converted. For example, the flip-flop 174 has signals applied to it to represent the binary digit of least significance. Similarly, the flip-flops 190 and 200 respectively receive signals representing the binary digits of second least significance and of greatest significance.

When a digital signal has a binary value of "0" it does not affect the previous operation of the flip-flop receiving the signal upon the occurrence of a "0" state of operation in the flip-flop. Because of this, a relatively low voltage is still produced on the lower output terminal of the flip-flop. However, a signal digitally representing a binary value of "1" causes the flip-flop to be triggered from its "0" state of operation to its "1" state of operation. Because of the triggering of the flip-flop, a relatively high voltage is produced on the lower output terminal of the flip-flop and a relatively low voltage is produced on the upper terminal of the flip-flop. In this way, the various output lines such as the lines 200, 202 and 204 have low and high voltages applied to them in a pattern corresponding to the pattern of the signals introduced to the different flip-flops. These signals provide a digital representation of the particular value to be converted into a corresponding analogue voltage.

The voltages of the various output lines such as the lines 200, 202 and 204 in FIGURE 3 are introduced to the input terminals of the different switches included in the converter shown in FIGURE 1. These voltages control the operation of their associated switches so that the precision resistances coupled to the switches become connected to the lines 15 and 17 in a pattern related to the pattern of the voltages on the different output lines such as the lines 200, 202 and 204. By connecting the different precision resistances in an individual pattern to the lines 15 and 17 in FIGURE 1, a particular voltage is produced on the line 12. As described in detail previously, this particular voltage has an amplitude representing the analogue value of the digital signals introduced to the counter 160. The amplitude of the analogue potential may actually be considered as the product of a first quantity represented by the digital signals and of a second quantity represented by the amplitude of the voltage between the lines 15 and 17. This has been described in detail previously.

The system shown in FIGURE 3 is not only able to provide a conversion from a digital representation to an analogue representation but is also able to provide a conversion from an analogue representation to a digital representation. This conversion is made on a dynamic basis by comparing the voltage on the line 12 in FIGURES 1 and 3 with the input voltage representing the analogue quantity to be converted into digital form and by adjusting the voltage on the line 12 to equal the input voltage. Since the potential on the line 12 is of a negative polarity, the input potential preferably has a positive polarity such that a zero voltage can be produced at the common terminal between the resistances 133 and 134 when the analogue quantity represented by the voltage on the line 12 corresponds to the input quantity.

When the output potential on the line 12 has an amplitude greater than that of the input voltage, a negative voltage is produced on the common terminal between the resistances 133 and 134. Similarly, a potential having a positive polarity is produced on the common terminal between the resistances 133 and 134 when the input voltage has a greater amplitude than the output voltage on the line 12. In this way, the polarity of the voltage produced on the common terminal between the resistances 133 and 134 provides a direct indication as to the polarity of any errors between the input and output representations.

The direct voltage on the common terminal between the resistances 133 and 134 is converted into an alternating signal. This alternating voltage fluctuates between a value of "0" and a potential having a polarity related to the polarity of the direct voltage on the common terminal between the resistances 133 and 134. The alternating voltage is produced at a frequency related to the rate of occurrence of the clock signals provided by the source 140. These clock signals are introduced to the stage 142, which operates to convert the clock signals into sharp and clean triggering signals. The output signals from the stage 142 are introduced to the emitter follower 144 to produce an impedance matching with the impedance presented by the delay line 148 and the flip-flop 146.

The signals from the emitter follower 144 are introduced directly to the upper input terminal of the flip-flop 146 in FIGURE 3 to trigger the flip-flop to a first state of operation. The signals from the emitter follower 144 also pass through the delay line 148 after a particular delay and trigger the flip-flop 146 to a second state of operation opposite to the first state. By providing the line 148 with a delay equal substantially to one-half of the period of time between successive clock pulses, the flip-flop 146 can be alternately triggered into its first and second states at a substantially constant rate.

When a negative potential is produced on the upper output terminal of the flip-flop 146 in FIGURE 3 in the first state of operation of the flip-flops, a ground potential is applied to the chopper 152 to obtain the production of a potential having a zero value from the chopper. However, the chopper 152 is able to produce a signal having a polarity related to the direct voltage on the common terminal between the resistances 132 and 134 when the upper output terminal of the flip-flop 146 has a potential approaching ground. This occurs in the second state of operation of the flip-flop 146. The resultant alternating signals produced in the chopper 152 are amplified by the stages 154 and are introduced to the triggering circuits 156 and 158. Since the amplifying stages 154 lose any reference potential, this reference potential is re-established in the triggering stages 156 and 158 by introducing the potential on the lower output terminal of the flip-flop 146 to the triggering circuits 156 and 158.

The triggering circuits 156 and 158 are gated to pass only signals of a particular polarity from the amplifier 154. For example, only signals of a positive polarity from the amplifier 154 are able to pass through the triggering circuit 156. These signals are inverted in polarity by the triggered circuit 156 so as to be introduced as negative signals to the input terminal 164 of the counter 160. Similarly, only signals having a negative amplitude are able to pass through the triggering stage 158. Because of the inverting operation provided by the triggering circuit 158, signals having a positive polarity are produced by the circuit. These signals are inverted by the stage 162 into negative triggering signals for introduction to the input terminal 166 of the counter 160.

Each triggering signal introduced to the terminals 164 and 166 triggers the flip-flop 174 from one state of operation to the other. Each of the signals introduced to the terminals 164 and 166 also passes through the amplifiers 180 and 182 to the amplifiers 176 and 178, respectively. For example, each signal introduced through the input terminal 164 passes through the amplifier 180 to the amplifier 186. However, the amplifier 176 is gated by the voltage on the lower output terminal of the flip-flop 174 so as to pass through this amplifier only upon the occurrence on the output terminal of the flip-flop of a negative voltage considerably different from ground.

Certain delays are provided in the coupling from the lower output terminal of the flip-flop 174 to the amplifier 176. These delays are sufficiently long so that the flip-flop 174 provides a control over the passage of signals through the amplifier 176 in accordance with its state of operation before the introduction of the triggering signal to the input terminal 164. This is necessary in order to have each stage control the operation of successive stages in accordance with its state of operation before each triggering pulse.

In like manner, the triggering signal introduced to the input terminal 166 passes through the amplifier 182 to the amplifier 178. The signal is able to pass through the amplifier 178 only when a negative voltage considerably different from ground has been produced on the upper output terminal of the flip-flop 174 before the introduction of the triggering signal to the input terminal 166.

Since the input terminal 164 receives triggering signals representing output signals of one polarity from the amplifier 154 and since the input terminal 166 receives triggering signals representing output signals of an opposite polarity from the amplifier 154, the counter 160 operates to count both in a forward and reverse direction. The counter counts in a forward direction upon the introduction of signals to the terminal 164 and counts in a reverse direction upon the introduction of signals to the terminal 166.

As will be seen from the subsequent discussion, each stage in the counter 160 controls the passage of triggering signals to the next stage. For example, the gating amplifiers 176 and 178 control the passage of triggering signals from the first stage to the flip-flop 190 in the second stage. The signals are able to pass through the first stage to the second stage for a forward count only upon an occurrence of a binary indication of "1" in the first stage. In like manner, signals are able to pass through the first stage to the second stage only upon the occurrence of a binary indication of "0" in the first stage.

By a similar reasoning, signals are able to pass to the third stage for a forward count only when both the first and second stages simultaneously have binary indications of "1." Signals are able to pass to the third stage for a reverse count only when binary indications of "0" simultaneously appear in the first two stages. Similar reasoning can be applied to the operation of successive stages in the counter.

In this way, a counter is obtained for counting incrementally in the forward and reverse directions to provide digital indications in a binary code for any decimal value. This counter has certain important advantages. One advantage is that it can count in forward and reverse directions without any requirement for complex circuitry. Another advantage is that the operation of each stage is controlled by gated amplifiers such that each gated amplifier has only two input signals applied to it regardless of the digital significance of the stage. This balanced operation in the gated amplifiers is important in preventing any of the stages from becoming over-loaded by an excess of input signals. This overloading often occurs in the stages of greatest significance in counters now in use.

The counter shown in block form in FIGURE 3 and described above also has certain other important advantages. It is able to change counts at a speed considerably in excess of counters now in use. This results from the fact that the triggering signals pass through the gated amplifiers in successive stages in accordance with the state of operation of the flip-flops in the previous stages before the introduction of the triggering signals. Since the gated amplifiers are formed primarily from transistors and associated impedances, the triggering signals can pass almost instantaneously through the successive gated amplifiers. Other advantages result from the detailed construction of the flip-flops and the associated circuitry in the counters, as will be described in detail subsequently.

*Detailed Diagram of System Including Converter*

The embodiment shown in FIGURE 3 and described above is illustrated in some detail in FIGURES 4 and 5. The circuitry shown in FIGURES 4*a* and 4*b* includes the clock source 140 also shown in FIGURE 3. The output signals from the clock source 140 in FIGURE 4*a* are introduced through a coupling capacitance 250 to first terminals of a resistance 252 and a capacitance 254 and to the ungrounded terminal of a resistance 256. Second terminals of the resistance 252 and the capacitance 254 are connected to the base of a semi-conductor such as a transistor 258, which may be a Type 2N247. The capacitance 250, the resistance 252, the capacitance 254 and the resistance 256 may be provided with suitable values such as 300 micro-microfarads, 0.27 kilo-ohms, 100 kilo-ohms and 1.8 kilo-ohms.

The emitter of the transistor 258 has a common connection with the ungrounded terminal of a resistance 260 which may be provided with a suitable value such as 0.27 kilo-ohms. The emitter of the transistor 258 also has a common connection with the emitter of a suitable semi-conductor such as a transistor 262, which may also be a Type 2N247. A resistance 264 and a capacitance 266 extend in parallel between the collector of the transistor 258 and the base of the transistor 262. A negative potential such as −12 volts is applied from a suitable source 270 of direct voltage to the collector of the transistor 258 through a line 273 and a resistance 272 having a suitable value such as approximately 1.0 kilo-ohms. A positive potential such as +2 volts is applied from the voltage source 270 to the base of the transistor 262 through a line 275 and a resistance 274 having a suitable value such as approximately 2.7 kilo-ohms. The voltage source 270 may correspond to the voltage source 16 shown in FIGURE 1.

The negative potential of approximately −12 volts is applied to the collector of the transistor 262 through the line 273 and a resistance 276 having a suitable value such as approximately 1.0 kilo-ohms. The signals produced on the collector of the transistor 262 pass through a suitable coupling capacitance 278 to first terminals of a resistance 280 and a capacitance 282. The resistance 280 and the capacitance 282 may have suitable values such as approximately 2.7 kilo-ohms and 1,000 micro-microfarads, respectively. The plate of a diode 284 and a resistance 286 also have common connections with the first terminals of the resistance 280 and the capacitance 282. The cathode of the diode 284 and the second terminal of the resistance 286 receive a slightly positive potential such as 0.5 volt through a line 287 from the voltage source 270. The resistance 286 may have a suitable value such as approximately 5.6 kilo-ohms.

Second terminals of the resistance 280 and of the capacitance 282 are connected to the base of a suitable semi-conductor such as a transistor 290, which may be a type 2N247. The collector of the transistor has a negative potential of −12 volts applied to it through the line 273 from the voltage source 270. A resistance 292 is connected between the emitter of the transistor 290 and ground and is provided with a value to match the input impedance to a delay line 346. The signals on the emitter of the transistor 290 are applied through a coupling capacitance 294 to first terminals of a resistance 296 and a capacitance 298. The first terminals of the resistance 296 and the capacitance 298 may be biased through a resistance 300 and the line 287 at a slightly positive potential. The capacitance 294, the resistance 296, the capacitance 298 and the resistance 300 may be provided with suitable values such as approximately 400 micro-microfarads, 2.7 kilo-ohms, 200 micro-microfarads and 5.6 kilo-ohms.

The base of a suitable semi-conductor such as a transistor 302 receives the signals produced at the second terminals of the resistance 296 and the capacitance 298. The transistor 302 may be a Type 2N247. The emitter of the transistor 302 is grounded and the collector is biased at a negative potential through a resistance 304 and the line 273 from the negative terminal of the voltage source 270. A capacitance 306 and a resistance 308 extend electrically in series between the negative terminal of the voltage source 270 and ground. The resistance 304, the capacitance 306 and the resistance 308 may be respectively provided with suitable values such as 1.0 kilo-ohms, 1,000 micro-microfarads and 2.7 kilo-ohms.

The plate of a diode 310 is connected to the common terminal between the capacitance 306 and the resistance 308, and the cathode of the diode is connected to the base of a suitable semi-conductor such as a transistor 312, which may be a Type 2N114. The emitter of the transistor 312 is grounded as is the emitter of a transistor 314, which may also be a Type 2N114. A resistance 316 and a capacitance 318 are in parallel between the collector of the transistor 312 and the base of the transistor 314. Similarly, a resistance 320 and a capacitance 322 are in parallel between the base of the transistor 312 and the collector of the transistor 314. Each of the resistances 316 and 320 may have a suitable value such as approximately 2.7 kilo-ohms, and each of the capacitances 318 and 322 may have a suitable value such as approximately 50 megohms. The collectors of the transistors 312 and 314 are negatively biased through resistances 324 and 326 each having a suitable value such as approximately 1.0 kilo-ohms.

Electrical components are associated with the transistor 314 in a manner similar to that described above for the transistor 312. These electrical components include a diode 330, a transistor 332, a resistance 334 and a capacitance 336, which correspond respectively in value and function to the diode 310, the transistor 302, the resistance 296 and the capacitance 298. The stages associated with the transistor 314 also include a transistor 338, a resistance 340 and a capacitance 342 which respectively correspond in value and function to the transistor 290, the resistance 280 and the capacitance 282.

Signals are applied to the resistance 340 and the capacitance 342 through a suitable coupling capacitance 344 from the output of a delay line 346 which is adapted to provide a suitable delay such as approximately 2.5 microseconds. The input to the delay line 346 is obtained from the emitter of the transistor 290. A resistance 347 having a value matching the output impedance of the delay line 346 is connected between the output terminal of the delay line and ground to provide an optimum operation of the delay line.

The potential on the collector of the transistor 312 in FIGURE 4*a* is applied to the base of a transistor 350 in FIGURE 4*b* through a lead 351 (FIGURES 4*a* and 4*b*) and a resistance 352 having a suitable value such as 18 kilo-ohms. The transistor 350 may be a Type 2N393. The base of the transistor 350 may be coupled through a resistance 354 having a value of 27 kilo-ohms to the line 275 extending from the voltage source. The emitter of the transistor 350 is connected to the same ground 353 as the converter shown in FIGURE 1.

The collector of the transistor 350 is connected to one terminal of a resistance 356 having a siutable value such as approximately 1.2 kilo-ohms. Connections are made from the second terminal of the resistance 356 to the plate of a diode 358 and the cathode of a diode 360, the cathode of the diode 358 and the plate of the diode being connected to the converter ground 353. The second terminal of the resistance 356 also has a common connection with the common terminal between the resistances 132 and 134, which are also shown in FIGURE 3. These resistances are included for comparing the input potential from the analogue source 136 with the potential produced on the line 12 in the converter shown in FIGURE 1.

The signals produced on the emitter of the transistor 350 are applied through a coupling capacitance 362 to the base of a suitable semi-conductor such as a transistor 364, which may be a Type 2N393. A resistance 366 having a suitable value such as approximately 100 kilo-ohms extends electrically from the base of the transistor 364 to the converter ground 353. A pair of resistances 368 and 370 are in series between the base of the transistor 364 and a line 372, which is connected to the voltage source 270 to receive a suitable negative potential such as —2 volts. A capacitance 374 is grounded at one end and at the other end is connected to the collector of the transistor 364 and to the common terminal between the resistances 368 and 370. The resistances 368 and 370 and the capacitance 374 may be respectively provided with suitable values such as 100 kilo-ohms, 0.10 kilo-ohms and 10 microfarads.

A resistance 378 having a suitable value such as approximately 4.7 kilo-ohms is connected between the emitter of the transistor 364 and the converter ground 353. A capacitance 380 and a resistance 382 are in series across the resistance 378. The capacitance 380 and the resistance 382 may be respectively provided with suitable values such as approximately 0.1 microfarads and 10 kilo-ohms. The resistance 382 is in series with resistances 384 and 386 between the converter ground 353 and the line 273, which is connected to the voltage source 270 to receive the negative potential of —12 volts. The resistances 384 and 386 may be respectively provided with suitable values such as approximately 1.8 kilo-ohms and 82 kilo-ohms.

The base of a suitable semi-conductor such as a transistor 388 is connected to the terminal common to the resistances 382 and 384. A resistance 390 having a suitable value such as 0.15 kilo-ohms is disposed electrically between the emitter of the transistor 388 and the converter ground 353. The collector of the transistor 388 is connected to one terminal of a resistance 394 having a suitable value such as approximately 1.0 kilo-ohms. The other terminal of the resistance 394 is connected to the common terminal between the resistances 384 and 386. A capacitance 396 having a suitable value such as approximately 10 microfarads extends electrically to the converter ground 353 from the common terminal between the resistances 384 and 386.

The collector of the transistor 388 is coupled through a suitable capacitance 400 to the base of a suitable semiconductor such as a transistor 402, which may be a Type 2N417. A pair of resistances 404 and 406 are in series between the base of the transistor 402 and a line 408 connected to the voltage source 270 to receive a suitable positive potential such as approximately +12 volts. A resistance 410 and a capacitance 412 are in series between the base of the transistor 402 and the converter 353. A resistance 414 is connected at one end to the ungrounded terminal of the capacitance 412 and at the other end to the line 273 extending from the voltage source 270. The resistances 404, 406, 410 and 414 and the capacitance 412 may be respectively provided with suitable values such as approximately 10 kilo-ohms, 0.47 kilo-ohms, 68 kilo-ohms, 0.47 kilo-ohms and 10 microfarads.

A resistance 418 having a suitable value such as approximately 1.0 kilo-ohms is connected between the emitter of the transistor 402 and the ungrounded terminal of the capacitance 412. Connections are made to opposite ends of a resistance 420 from the collector of the transistor 402 and the common terminal between the resistances 404 and 406. A capacitance 422 extends electrically to the converter ground 353 from the common terminal between the resistances 404 and 406. The resistance 420 and the capacitance 422 may respectively have suitable values such as approximately 0.27 kilo-ohms and 10 microfarads.

A resistance 424 and a capacitance 426 are in series between the line 408 and the converter ground 353. The resistance 424 and the capacitance 426 may respectively have suitable values such as approximately 0.22 kilo-ohms and 10 microfarads. The collector of a suitable semi-conductor such as a transistor 428 is connected to the common terminal between the resistance 424 and the capacitance 426. The transistor 428 may be a Type 2N184. A resistance 430 having a suitable value such as approximately 22 kilo-ohms extends electrically between the collector and base of the transistor 428.

A capacitance 432 having a suitable value such as 0.05 microfarads couples the base of the transistor 428 to the collector of the transistor 402. The emitter of the transistor 428 is connected to the common terminal between resistances 434 and 436, which are respectively provided with suitable values such as approximately 1.0 kilo-ohms and 0.47 kilo-ohms. The second terminal of the resistance 434 is electrically coupled to the collector of a suitable semi-conductor such as a transistor 440, which may be a Type 2N417. The signals produced on the second terminal of the resistance 436 are coupled through a suitable capacitance 442 to the emitter of a suitable semi-conductor such as a transistor 444, which may be a Type 2N184.

A resistance 446, a capacitance 448 and resistances 450, 452 and 454 correspond respectively to the components 424, 426, 430, 434 and 436. One terminal of the resistance 450 has common connections with the bases of the transistors 428 and 440. The signals produced on one terminal of the resistance 454 are also coupled through the capacitance 442 to the emitter of the transistor 444. Connections are made from the base of the transistor 444 to the first terminals of resistances 460 and 462 and of a capacitance 464. The second terminal of the capacitance 464 is connected to the converter ground 353, and the second terminal of the resistance 460 is connected to the line 408. A connection is made through a line 463 (FIGURES 4*a* and 4*b*) to the collector of the transistor 314 shown in FIGURE 4*a*. The resistances 460 and 462 and the capacitance 464 may be respectively provided with suitable values such as 5.6 kilo-ohms, 0.56 kilo-ohms and 100 micro-microfarads.

The emitter of the transistor 444 is coupled to the plate of a diode 466 and to the cathode of a diode 468 through a resistance 470 having a suitable value such as approximately 2.7 kilo-ohms. The cathode of the diode 466 and the plate of the diode 468 are connected to the converter ground 353. The signals produced on the plate of the diode 466 and the cathode of the diode 468 control the operation of successive stages which are shown in block form since they correspond to stages previously shown. These stages include an emitter follower 472, an A.C. amplifier 474, an A.C. amplifier 476, gating amplifier stages 478 and a clamping circuit 480.

The emitter follower 472 corresponds to the stage which includes the transistor 364, and the amplifier 474 corresponds to the stage which includes the transistor 388. The A.C. amplifier 476 may be constructed in a manner similar to the stage which includes the transistor 402, and the gating amplifiers 478 may be constructed in a manner similar to the stages which include the transistors 428 and 440. The clamping circuit 480 may have a construction similar to that disclosed above for the stage which includes the transistor 444.

The output from the clamping circuit 480 is coupled to the base of a transistor 482 through a resistance 484 and a capacitance 486 in parallel. The transistor 482 may be a type 2N247 and the resistance 484 and the capacitance 486 may be respectively provided with suitable values such as approximately 0.47 kilo-ohms and 100 microfarads. A resistance 488 having a suitable value such as approximately 1.8 kilo-ohms is coupled between the base of the transistor 482 and the movable contact of a potentiometer 490. The potentiometer 490 extends electrically from the emitter of the transistor 482 to ground and may have a suitable value such as approximately 0.5 kilo-ohms.

A negative voltage is applied to the collector of the transistor 482 through a resistance 492 having a suitable value such as approximately 1.2 kilo-ohms. A resistance 494 and a capacitance 496 are in parallel between the collector of the transistor 482 and the base of a suitable semi-conductor such as a transistor 500, which may be a Type 2N247. The base of the transistor 500 is coupled through a suitable resistance and through the line 275 to the voltage source 270 to receive a suitable potential such as +2 volts. The emitter of the transistor 500 has a common connection with the emitter of the transistor 482. The collector of the transistor 500 is connected to one terminal of a resistance 502 having a suitable value such as approximately 1.2 kilo-ohms. The other terminal of the resistance 502 is electrically disposed to receive a suitable negative potential from the line 273.

The output signals on the collector of the transistor 500 are introduced to the base of a transistor 504, the base being positively biased through a resistance 503 from the line 275. The emitter of the transistor 504 is grounded. The signals on the collector of the transistor 504 are in turn introduced to the base of a transistor 506. A suitable resistance 508 is connected between the emitter of the resistance 506 and ground and a suitable resistance 510 is connected between the collector of the transistor and the line 408 from the voltage source 270. The signals produced on the collector of the transistor 506 are introduced to the terminal 166 in the counter 160 shown in FIGURE 3.

The output signals from the clamping circuit 480 are also introduced through a resistance 512 and a capacitance 514 in parallel to the base of a suitable semi-conductor such as a transistor 516. The transistor 516 may be a Type 2N167. A resistance 518, a potentiometer 520 and a resistance 522 are associated with the transistor 516 in a manner similar to that described above for the relationship between the transistor 482 and the resistance 488, the potentiometer 490 and the resistance 492. However, the resistance 522 is connected to the line 408 to receive a positive potential of +12 volts rather than a negative potential of −12 volts. The components 512, 514, 518, 520 and 522 have values corresponding respectively to the components 482, 486, 488, 490 and 492.

The output signals from the transistor 516 are coupled through a resistance 524 and a capacitance 526 in parallel to the base of a transistor 528, which may be a Type 2N167. Resistances 530 and 532 are associated with the transistor 528 in a manner similar to that described above for the relationship between the transistor 500 and the resistances 502 and 503. However, the resistance 530 receives a suitable negative potential such as −2 volts and the resistance 532 receives a suitable positive potential such as +12 volts. The signals produced on the collector of the transistor 528 are introduced to the base of a transistor 536. The resultant signals produced on the collector of the transistor 536 are applied to the terminal 164 in the counter 160 shown in FIGURE 3.

The triggering signals from the clock source 140 in FIGURE 4*a* are introduced through the coupling capacitance 250 to the resistance 252 and the capacitance 254, which act to sharpen the triggering signal for introduction to the base of the transistor 258. The triggering signal introduced to the base of the transistor 258 from the clock source 140 has a negative polarity as indicated at 550 in FIGURE 4*a*. The negative signal causes the transistor 258 to become conductive such that current flows through a circuit including the resistance 260, the transistor 258 and the resistance 272. The current flowing through the circuit causes the potential on the collector of the transistor 258 to rise from the negative potential on the line 273 toward ground. In this way, a positive signal indicated at 552 is produced on the collector of the transistor 258. At the same time, the current flowing through the transistor 258 causes the potential on the emitter of the transistor to decrease in a negative direction from a potential approaching ground.

The transistor 262 is normally conductive since the emitter of the transistor is substantially at ground and the base of the transistor is biased at a negative potential by the voltage divider network formed by the resistances 272, 264 and 274. However, the transistor 262 becomes cut off upon the simultaneous introduction of the positive signal 552 to the base of the transistor and the negative signal 554 to the emitter of the transistor.

When the transistor 262 becomes cut off, current is no longer able to flow through a circuit including the transistor and the resistance 276. This causes the potential on the collector of the transistor 262 to fall toward the negative potential on the line 273 such that a negative triggering signal 556 is produced on the collector. This negative triggering signal is coupled through the capacitance 278 to the parallel combination of the resistance 280 and the capacitance 282, which operate to sharpen the signal for introduction to the base of the transistor 290.

The negative triggering signal introduced to the base of the transistor 290 causes the transistor to become conductive and current to flow through a circuit including the resistance 292 and the transistor. Because of the flow of current through the resistance 292, a negative triggering signal indicated at 558 is produced on the emitter of the transistor 290. This triggering signal is introduced through the coupling capacitance 294 and the parallel combination of the resistance 296 and capacitance 298 to the base of the transistor 302. The transistor 302 is normally cut off because of the ground potential on the emitter of the transistor and the slightly positive potential on the base. However, the transistor becomes conductive upon the introduction of the negative triggering signal 558 to obtain a flow of current through a circuit including the transistor 302, the resistance 304 and the line 273. This current causes the potential on the collector of the transistor 302 to rise from the negative potential on the line 273 to a potential approaching ground such that a positive signal 560 is produced.

The positive signal 560 passes through the coupling capacitance 306 and the diode 310 to the base of the transistor 312. The transistor 312 may be conductive at the time that the signal 560 is introduced to its base. Upon the introduction of the signal 560, the transistor 312 becomes cut off to prevent current from flowing through a circuit including the transistor, the resistance 324 and the line 273. This causes the potential on the collector of the transistor 312 to fall from a potential approaching ground to a negative potential approaching that on the line 273.

The negative signal produced on the collector of the transistor 312 is sharpened by the resistance 316 and the capacitance 318 and is introduced to the base of the transistor 314. This signal makes the transistor 314 conductive and produces a flow of current through a circuit including the transistor, the resistance 326 and the line 273. The flow of current through the transistor 314 causes the potential on the collector of the transistor to rise toward ground from the negative potential approaching that on the line 273. The resultant positive signal is introduced through the resistance 320 and the capacitance 322 to the base of the transistor 312 to accentuate the tendency of the transistor 312 to become cut off.

The negative triggering signal 558 is introduced to the delay line 346 as well as to the base of the transistor 302. This signal passes through the delay line 346 after a suitable time such as approximately 2.5 microseconds. This time interval is preferably one-half that between successive triggering signals produced by the clock source 140. After passing through the delay line 346, the signal 558 is sharpened and is introduced to the base of the transistor 338.

The transistor 338 is normally cut off since the base has a positive potential applied to it and the emitter is essentially at ground. However, the negative triggering signal passing through the delay line 346 is introduced to the base of the transistor 338 to make the transistor conductive. The resultant flow of current through the transistor 338 causes a negative signal indicated at 562 to be produced on the emitter of the transistor. This signal is introduced to the base of the transistor 332 to trigger the transistor 332 from a nonconductive state to a conductive state. The flow of current through the transistor 332 causes the potential on the collector of the transistor to rise toward ground from a negative potential approaching that on the line 273. This flow of current produces a positive signal indicated at 564 on the collector of the transistor.

The signal 564 passes through the diode 330 to the base of the transistor 314 and cuts off the transistor to produce a negative potential on the collector of the transistor. This negative potential is coupled through the resistance 320 and the capacitance 322 to the base of the transistor 312 to make the transistor conductive. This causes a ground potential to be produced on the collector of the transistor 312 for introduction to the base of the transistor 314 to insure that the transistor 314 will become cut off. In this way, the transistor 312 becomes conductive and the transistor 314 becomes cut off at an intermediate time between the introduction of each pair of successive clock signals 550. By controlling in this manner the operation of the flip-flop formed by the transistors 312 and 314, signals approaching ground and approaching the negative potential on the line 273 are alternately produced on the collectors of the transistors.

The signals produced on the collector of the transistor 312 in FIGURE 4*a* control the operation of the transistor 350 in FIGURE 4*b*. When the signals on the collector of the transistor 312 have a negative polarity in alternate half cycles, the transistor 350 becomes conductive such that a potential approaching ground is produced on the emitter of the transistor. This ground potential provides a clamp to prevent any potentials above or below ground from being applied from the common terminal between the resistances 133 and 134 through the capacitance 362 to the base of the transistor 364.

In alternating half cycles, a potential approaching ground is produced on the collector of the transistor 312. This potential causes the transistor 350 to become cut off so that the emitter of the transistor cannot become clamped to ground. At such times, a signal representing the polarity of the potential on the common terminal between the resistances 133 and 134 is able to pass the emitter of the transistor 350. This signal passes through the coupling capacitance 362 to the base of the transistor 364. This signal represents any difference between the input potential from the analogue source 136 and the output potential on the line 12 of the converter 130 shown in FIGURE 1.

The signal passing from the common terminal between the resistances 133 and 134 to the base of the transistor 364 has only a limited amplitude because of the action of the diodes 358 and 360. These diodes are provided with characteristics to produce across the diodes a potential approaching that on the common terminal between the resistances 133 and 134 when this potential has a relatively low amplitude. However, the potential produced across the diodes remains substantially constant even when the potential on the common terminal between the resistances 133 and 134 increases above a particular amplitude.

The transistor 364 is included in an emitter follower stage and is normally only partially conductive. This results from the biases provided by the resistance 378 and the resistances 368 and 370. Upon the introduction of a positive signal to its base, the transistor 364 tends to become cut off such that the potential on the emitter of the transistor rises from a negative value to a value approaching ground. Similarly, the flow of current through the transistor 364 tends to increase when a negative signal is introduced to the base of the transistor. This increased flow of current causes an increased voltage drop to be produced across the resistance 378 such that a negative signal is introduced through the capacitance 380 to the base of the transistor 388. The capacitance 374 provides a filtering action to eliminate ripples so that the emitter follower will respond only to actual signals passing to the base of the transistor 364 from the common terminal between the resistances 133 and 134.

The transistor 388 is included in an alternating current amplifier and is biased to partial conduction so as to respond to both positive and negative signals. The resultant signals produced on the collector of the transistor 388 are introduced to the base of the transistor 402, which is included in a second stage for providing alternating current amplification. The transistor 402 is also biased to partial conduction so that it responds to both positive and negative signals. In this way, signals having a negative amplitude are produced on the collector of the transistor 402 in alternate half cycles when a negative potential is produced on the common terminal between the resistances 133 and 134. Similarly, signals having a positive amplitude are produced on the collector of the transistor 402 in alternate half cycles upon the occurrence of a positive potential on the common terminal between the resistances 133 and 134.

The signals produced on the collector of the transistor 402 are introduced to the bases of the transistors 428 and 440. The transistor 428 is biased to become conductive in the alternate half cycles when the signals on the collector of the transistor 402 have a positive amplitude. Similarly, the transistor 440 becomes conductive in the alternate half cycles upon the occurrence of a negative amplitude for the signals produced on the collector of the transistor 402.

The signals produced on the emitters of the transistors 428 and 440 are introduced to the base of the transistor 444, which provides a clamping action in a manner similar to that described above for the transistor 350. This clamping action establishes a ground on the emitter of the transistor 444 in alternate half cycles by making the transistor conductive in these half cycles. The clamp is established by the potential on the collector of the transistor 314 rather than on the collector of the transistor 312 since the transistor 444 is an NPN type rather than a PNP type. The ground potential has to be established as a reference in alternate half cycles since this reference is lost as a result of the operation of the amplifier stages which include the transistors 388 and 402.

In the other half cycles, signals on the emitters of the transistors 428 and 440 pass through the coupling capacitance 442 and the resistance 470. The signals are able to pass the emitter of the transistor 444 in these half cycles since the emitter is not clamped to ground. The signals then become limited in amplitude by the action of the diodes 466 and 468 in a manner similar to that described above for the diodes 358 and 360. The signals become further cleaned, sharpened and amplified in successive stages including the stages 472, 474, 476 and 478 and are thereafter introduced to the clamping circuits 480 which corresponds to the stages including the transistor 444.

The output signals from the clamping circuit 480 pass to the base of the transistor 482. When the signals have a negative amplitude, they cause the transistor 482 to become conductive so that current flows through a circuit including the potentiometer 490, the transistor 482 and the resistance 492. The flow of current through this circuit causes the potential on the collector of the transistor 482 to rise toward ground from a negative potential approaching that on the line 273. The potential approaching ground on the collector of the transistor 482 is introduced to the base of the transistor 500. This potential tends to cut off the flow of current through the normally conductive transistor 500.

When the transistor 500 tends to become cut off, the potential on the emitter of the transistor approaches ground. This potential is introduced to the emitter of the transistor 482 to increase the conductivity of the transistor by increasing the voltage difference between the base and the emitter of the transistor. In this way, the transistor 500 provides a positive feedback for enhancing the production of a signal on the collectors of the transistors 482 and 500. The operation of the transistors 482 and 500 is also enhanced by adjusting the positioning of the movable contact of the potentiometer 490. This adjustment controls the threshold level at which the transistor 482 becomes conductive upon the introduction of a negative signal to its base. The threshold level is adjusted in this manner since the voltage difference between the base and emitter of the transistor 482 becomes varied by adjusting the movable contact of the potentiometer 490. By adjusting the movable contact of the potentiometer 490 in this manner, the transistors 482 and 500 can be made insensitive to spurious signals. The signals produced on the collector of the transistor 500 are amplified by the stages including the transistors 504 and 506 and are introduced to the terminal 166 to obtain a subtraction of one integer in the count provided by the counter 160 shown in FIGURE 3.

The output signals from the clamping circuit 480 are also introduced to the base of the transistor 516. Since the transistor 516 is an NPN type, it becomes conductive only upon the introduction of positive signals. The transistor 516 is included with the transistor 528 in a positive feedback circuit which corresponds to that provided by the transistors 482 and 500. In this way, relatively sharp signals are produced on the collector of the transistor 528. These signals are amplified by the transistor 536 and are introduced to the transistor 164 in the counter 160 shown in FIGURE 3 to indicate a positive increment. In this way, the counter 160 provides a forward count in a manner similar to that described above.

As previously described, the different stages in the counter 160 provide a digital indication as to the value of the potential on the line 12 in the converter shown in FIGURE 1. When the count provided by the counter 160 varies, it produces a corresponding variation in the pattern of operation of the switches shown in FIGURE 1. Thns in turn produces a corresponding variation in the potential produced on the output line 12 from the converter 130. In this way, the potential on the line 12 becomes automatically adjusted until this potential equals the analogue quantity represented by the potential from the source 136. Upon the occurrence of such an equality in potential, the different switches in the converter shown in FIGURE 1 have a pattern of operation digitally representing the analogue input quantity. As previously described, the converter shown in FIGURE 1 can actually be considered to represent the quotient between a dividend as represented by the analogue input voltage and the divisor as represented by the potential introduced to the converter shown in FIGURE 1 from the voltage source 16. This is especially true when the potential introduced to the converter from the voltage source 16 shown in FIGURE 1 is made variable to conform with changes in the value of the divisor.

*Counter*

Two stages of the counter 160 shown in block form in FIGURE 3 are illustrated in detail since they are believed to include certain novel features. Although only two stages are shown in detail, the other stages may be constructed in a similar manner, as will be apparent to a person skilled in the art. The stages include a capacitance 600 connected between the terminal 164 and the cathode of a diode 602. Similarly a capacitance 604 is connected between the terminal 166 and the cathode of a diode 606. Resistances 608 and 610 respectively extend electrically from the cathodes of the diodes 602 and 606 to ground.

The plates of the diodes 602 and 606 have common connections with each other and with the cathodes of diodes 612 and 614. The plates of the diodes 612 and 614 are respectively connected to first terminals of resistances 616 and 618, the second terminals of which are grounded. The potentials on the plates of the diodes 612 and 614 are also respectively introduced to the bases of transistors 620 and 622, which may be types PNP. A resistance 624 and a capacitance 626 are in parallel between the emitters of the transistors 620 and 622 and ground.

A parallel combination of a resistance 630 and a capacitance 632 are disposed electrically between the base of the transistor 620 and the collector of the transistor 622. The collector of the transistor 622 is adapted to receive a suitable negative potential such as approximately −12 volts through a resistance 640 from the line 273. In like manner, a resistance 642 and a capacitance 644 are in parallel between the base of the transistor 622 and the collector of the transistor 620. A resistance 646 extends electrically from the collector of the transistor 620 to the line 273.

A resistance 648 and a capacitance 650 are in parallel between the collector of the transistor 620 and the base of a transistor 652, which may be a type NPN. The base of the transistor 652 also receives signals through a capacitance 654 from the collector of a transistor 656 which may be a PNP type. The emitters of the transistors 652 and 656 are grounded.

The collector of the transistor 652 is adapted to be biased at a positive potential through a resistance 660 from the line 408, which provides a positive potential of approximately 12 volts. The signals produced on the collector of the transistor 652 are introduced to a terminal 662 in the second stage of the counter corresponding to the terminal 164 in the first stage. The collector of the transistor 656 is adapted to be biased at a negative potential through a resistance 664 from the line 273. A parallel combination of a resistance 666 and a capacitance 668 are in series with a coupling capacitance 670 between the base of the transistor 656 and the terminal 164. A resistance 672 extends electrically in series from the common terminal between the resistance 666 and the capacitances 668 and 670 to the line 275, which provides a positive potential of +2 volts.

Stages are associated with the transistor 622 in a manner similar to that described above for the transistor 620. These stages include transistors 676 and 678 which respectively correspond to the transistors 652 and 656. The stages also include capacitances 680 and 682 which correspond to the capacitances 650 and 654. The output signals on the collector of the transistor 676 are introduced to a terminal 684 in a second stage corresponding to the terminal 166 in the first stage.

The transistors 620 and 622 are included in a flip-flop such that only one of the transistors can be conductive at any instant and such that the other transistor is cut off at that instant. By way of illustration, the transistor 620 may be cut off and the transistor 622 may be conductive. A triggering signal may be introduced to either the terminal 164 or the terminal 166 at the time that the transistor 620 is cut off and the transistor 622 is conductive. This signal has no effect on the transistor 622 since the transistor is already conductive. However, the signal is introduced to the base of the transistor 620 to make the transistor conductive. The diodes 612 and 614 operate to insure that the signals will be introduced to the bases of the transistors 620 and 622 and at the same time operate to insure that the bases of the transistors will not be directly connected to each other.

When the transistor 620 becomes conductive, current flows through a circuit including the resistance 624, the transistor and the resistance 646. Because of this flow of current, the potential on the collector of the transistor 620 rises toward ground from a negative potential approaching that on the line 273. This increase in potential is applied through the resistance 642 and the capacitance 644 in parallel to the base of the transistor 622 to cut off the transistor. As the transistor 622 becomes cut off, the potential on the collector of the transistor falls toward a value approaching that on the line 273. This decrease in potential is introduced to the base of the transistor 620 through the resistance 630 and the capacitance 632 to increase the flow of current through the transistor.

By way of illustration, the negative triggering signal described in the previous paragraph may be introduced to the terminal 164 rather than to the terminal 166. This signal causes the transistor 656 to become conductive so that the potential on the collector of the transistor rises toward ground from a level approaching that on the line 273. This increase in potential is coupled through the capacitance 654 to the base of the transistor 652 to make the transistor conductive.

The base of the transistor 652 also receives the potential on the collector of the transistor 620. However, the capacitances 650 and 654 provide a charging circuit for delaying the introduction of the potential on the collector of the transistor 620 to the base of the transistor 652. In this way, the operation of the transistor 652 is controlled by the potential produced on the collector of the transistor 620 before the introduction of the triggering signal to the terminal 164.

Since the transistor 620 was cut off before the introduction of the triggering signal to the terminal 164, the collector of the transistor was at a negative potential approaching that on the line 273. This potential is sufficiently negative to prevent the transistor 652 from becoming conductive even upon the introduction of a positive signal from the collector of the transistor 656. By maintaining the transistor 652 cut off, the triggering signal introduced to the terminal 164 is not able to pass through the transistor 652 to the input terminal 662 in the second stage of the counter. Since the triggering signal is blocked from passing to the second stage of the counter 160, it is also blocked from passing to successive stages of the counter.

The second triggering signal may be introduced to the terminal 164. This triggering signal also passes through the transistor 656 to produce a positive signal on the collector of the transistor. The positive signal is introduced to the base of the transistor 652 to prepare the transistor for a flow of current in accordance with the potential on the collector of the transistor 620. Since the transistor 620 was in a state of conductivity before the introduction of this second triggering signal to the terminal 164, a potential approaching ground was produced on the collector of the transistor. This potential is sufficiently positive to make the transistor 652 conductive. In this way, a triggering signal is able to pass through the first stage of the counter 160 to the input terminal 662 of the second stage of the counter.

It will be seen from the above discussion that similar principles may be applied to the operation of the counter 160 upon the introduction of triggering signals to the input terminal 166. In this way, a counter is provided which is able to count in a forward or reverse direction and which is able to provide such a count with a minimum amount of delay. This minimum delay results from the fact that each stage controls the operation of the next stage in accordance with its state of operation before the introduction of a triggering pulse rather than its state of operation after the introduction of the triggering pulse. The counter is also advantageous in that it provides the same loading for each stage rather than providing increased loading for successive stages as in counters now in use. This results from the fact that each gated amplifier such as the amplifier 176 has only two signals introduced to its input terminals.

*Modification Shown in FIGURE 6*

At certain times, a considerable difference may exist between the amplitude of the input voltage from the source 136 and the amplitude of the voltage produced on the output line 12 of the converter 130. In order to eliminate this difference as quickly as possible, certain modifications may be provided in the system shown in block form in FIGURE 3. These modifications are shown in FIGURE 6. The modifications include an A.C. amplifier 700 and a flip-flop 702 which may respectively correspond to the stages 154 and 146 in FIGURE 3.

The potential on the upper output terminal of the flip-flop 702 is introduced to first terminals of gated triggering circuits 704, 706, 708 and 710. Second input terminals of the gated triggering circuits 704, 706, 708 and 710 are connected to the output terminals of the amplifier 700. The circuits 704 and 706 are constructed to be responsive only to negative signals from the amplifier 700, and the circuits 708 and 710 are constructed to be responsive only to positive signals from the amplifier 700. The circuits 706 and 708 are responsive to input signals of relatively low amplitude from the amplifier 700. However, the circuits 704 and 710 are biased to be responsive only to signals having a particular amplitude greater than the amplitudes of the signals required to trigger the circuits 706 and 708.

The output signals from the gated triggering circuits 706 and 708 are respectively introduced to the upper and lower input terminals of a first flip-flop 712 in a counter generally indicated at 714. The counter 714 corresponds to the counter 160 shown in FIGURE 3, and the flip-flop 712 corresponds to the flip-flop 174 in the counter 160 so as to provide an indication as to the value of a least significant digit. The output signals from the gated triggering circuits 704 and 710 are also respectively introduced to the upper and lower input terminals of a flip-flop 760 which is also included in the counter 714. The flip-flop 716 is adapted to provide an indication as to the value of a digit of increased significance relative to the significance of the digit indicated by the flip-flop 712. By way of illustration, the flip-flop 716 may provide an indication as to the value of the digit of fourth least significance.

When the difference between the input voltage from the source 136 and the potential on the line 12 from the converter 130 is relatively low, signals of relatively low amplitude are produced by the amplifier 700. When such signals have a positive amplitude, they are able to pass through the triggering circuit 708 but are not able to pass through the triggering circuit 710 because of the increased bias provided by the triggering circuit 710. This causes the flip-flop 712 to be triggered so that the count in the counter 714 is changed only by one integer. This produces a corresponding variation in the operation of the different switches in the converter 130.

Upon the occurrence of a considerable difference between the input potential from the source 136 and the potential on the line 12 of the converter 130, the amplifier may produce signals with sufficient amplitude to overcome the bias of the gated triggering circuit 710. The resultant passage of a signal through the circuit 710 causes the flip-flop 716 to be triggered. As will be seen, this produces a considerable change in the count provided by the counter 714 and also provides a considerable change in the operation of the converter 130. In this way, a considerable variation is produced in the potential on the line 12 of the converter so that this potential will quickly approach the input potential from the source 136.

It will be seen that a signal passes through the triggering circuit 708 at the same time that it passes through the triggering circuit 710. Because of this, the flip-flop 712 becomes triggered at the same time that the flip-flop 716 becomes triggered. This presents no complications in operation since it provides an additional slight increase in the voltage adjustment produced on the line 12 at any instant when considerable differences exist between the potentials on line 12 and from the source 136.

When the potential on the line 12 starts to approach the input potential from the source 136, the signals from the amplifier 700 fall below the level where they are able to pass through the circuit 710. At such times, only a fine control is provided by the passage of signals through the triggering circuit 708. In this way initially a coarse control may be provided to have the operation of the converter approximate the input potential from the source 136. Subsequently, a fine control may be provided to have the potential on the line 12 become exactly equal to the input potential from the source 136.

The above discussion has proceeded on the basis of signals passing through the triggering circuits 708 and 710 to provide a forward count of the counter 714. Similar principles apply to the passage of signals through the triggering circuits 704 and 706 to obtain a reverse count in the counter 714. It is believed that this will be apparent to a person skilled in the art.

*Square Root*

The converter constituting this invention can also be conveniently adapted to provide other operations than multiplication and division. For example, the system shown in FIGURE 7 uses a pair of the converters constituting this invention to obtain a square root of an analogue quantity. One of the converters is indicated schematically in broken lines at 800 and includes switches 802 corresponding to those shown in FIGURE 1 and also includes a resistance matrix similar to that shown in FIGURE 1 and indicated schematically as a potentiometer 804. The other converter is indicated schematically in broken lines at 806 and includes switches 808 and a resistance matrix represented schematically by a potentiometer 810.

The converter 806 receives a regulated potential $V_R$ corresponding to the potential from the voltage source 16 in FIGURE 1. Each converter produces an output potential on a line corresponding to the line 12 in FIGURE 1. The output potential is indicated schematically as being produced on the movable arm of the potentiometer representing the resistance matrix in the converter. The output potential from the converter 806 is introduced to the converter 800 to serve as the regulated potential for the converter. The output potential from the converter 800 is introduced to a comparator 812, which includes stages such as the chopper 152 in FIGURE 3.

The comparator 812 also receives an input potential $V_1$ representing an analogue quantity whose square root is to be determined. The output quantity from the comparator 812 is introduced to control circuits 814 corresponding to the circuits shown in FIGURE 4*b*. The output signals from the circuits 814 control the operation of a counter 816 corresponding to the counter 160 in FIGURE 3. The output from the counter 816 provides a digital indication as to the desired result.

The comparator 812 compares the analogue input quantity $V_1$ with the analogue output from the converter 800. Any resultant error signals cause a corresponding change to be produced in the pattern of operation of the flip-flops in the counter 816. The flip-flops in the counter 816 in turn produce corresponding changes in the pattern of operation of the switches in the converters 800 and 806. In this way, the converters 800 and 806 become adjusted in operation until no error signal is produced by the comparator 812.

The output potential from the converter 806 may be represented as $V_1=NV_R$ in a manner similar to that described previously. Since this potential is introduced as the regulated potential to the converter 800, the output potential from the converter 800 may be represented as $V_1=N(NV_R)$. Solving for $N$, $N=\sqrt{V_1/V_R}$. In this way, the square root of an input quantity may be indicated by the pattern of operation of the flip-flops in the counter 816. The square root of $V_1$ may be obtained by maintaining $V_R$ constant and varying only $V_1$. The square root of the quotient represented by $V_1/V_R$ may be obtained when both $V_1$ and $V_R$ are variable quantities.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination for providing a conversion between digital and analogue representations, a plurality of switching means each normally operative in a first relationship and each capable of being converted to a second operative relationship in accordance with the introduction of digital information to the switching means, means for providing an introduction of digital information to the switching means to obtain a pattern of operation of the switching means in accordance with the digital information, means for providing a reference voltage between first and second terminals, a plurality of impedances each connected at one terminal to a different one of the switching means and provided with a common connection at the other terminal for a coupling of the first terminal of each impedance to the first terminal of the voltage means in the first operative relationship of the associated switching means and for a coupling of the first terminal of each impedance to the second terminal of the voltage means in the second operative relationship of the associated switching means and each provided with a value geometrically related to the values of the other impedances to obtain the production at the common terminal of an output potential related to the digital inputs to the switching means, and an impedance connected between the common terminal and the first terminal of the voltage means and provided with a value corresponding to that of a particular one of the impedances in the plurality to limit the output potential on the common terminal.

2. In combination for providing a conversion between digital and analogue representations, a plurality of impedances each connected in a different branch and each having a progressive value relative to the value of the impedance in the preceding branch and each having a common output terminal, means for providing a reference voltage between first and second terminals, means for providing an input voltage for conversion to a digital representation, a plurality of switching means each operative in one relationship to connect its associated impedance between the first terminal of the voltage means and the common output terminal and each operative in a second relationship to connect its associated impedance between the common output terminal and the second terminal of the voltage means, means including a comparator responsive to any differences between the input voltage and the voltage on the common output terminal for producing voltage pulses representing the polarity of such differences, a counter responsive to the voltage pulses from the comparator for providing a digital representation of the input voltage and including a plurality of stages each coupled to a different one of the switching means for producing an operation of the switching means in the first and second relationships in accordance with the operation of the different stages in the counter, and means responsive to the input voltage for providing an operation of the switching means in a first particular one of the stages for an input voltage less than a particular amplitude and for providing an operation of the switching means in a second particular one of the stages for an input voltage greater than the particular amplitude.

3. In combination for providing a conversion between digital and analogue representations, a plurality of impedances each connected in a different branch and each provided with a value having a progressive relationship with respect to the value in the next branch, means for providing a particular voltage and having first and second terminals, an output terminal connected to first terminals of each of the impedances, a plurality of switching means each connected in a different one of the branches and each operative in a first relationship to connect its associated impedance between the output terminal and the first terminal of the voltage means and operative in a second relationship to connect its associated impedance between the output terminal and the second terminal of the voltage means, means for providing an input voltage for conversion into a digital representation, means including a comparator for comparing the voltage produced on the output terminal and the voltage means and for adjusting the operation of the switching means in accordance with such comparison to produce an equality between the comparison for the production of a digital representation in accordance with the pattern of operation of the switching means, and means responsive to the input voltage for obtaining the operation of first particular switching means in the plurality for amplitudes less than a particular value and for obtaining the operation of second particular switching means in the plurality for amplitudes greater than the particular value.

4. In combination for providing a conversion between digital and analogue representations, means for providing an input voltage, means for providing a reference voltage between first and second terminals, a plurality of impedances each having a value geometrically related to the values of the other impedances in the plurality and each having a common output terminal, a plurality of switching means each having first and second relationships and each coupled electrically to a different impedance means to control the coupling of the impedances between the output terminal and the first or second terminals of the voltage means in accordance with the operative relationships of the associated switching means, means for providing a control over the operation of the switching means in accordance with the relationship between the input and reference voltages, and an impedance connected between the common output terminal and the second terminal and provided with a value corresponding to that of a particular one of the impedances in the plurality to limit the potential on the common output terminal upon the operation of all of the switching means in the second relationship.

5. In combination for providing a conversion between digital and analogue representations, means for providing an input voltage, means for providing a reference voltage between first and second terminals, a plurality of resistances each provided with a value substantially twice as great as the value of a different resistance in the plurality and each connected to a common output terminal, a plurality of switching means each operative in first and second relationships and each connected to a different resistance in the plurality and each operative in a first relationship to connect the electrically associated resistance between the output terminal and the first terminal in the voltage means and each operative in a second relationship to connect the electrically associated resistance between the output terminal and the second terminal in the voltage means, means for producing a controlled transfer of the switching means from the first operative relationship to the second operative relationship in an individual pattern dependent upon the relationship between the input and reference voltages, and a resistance connected between the output terminal and the first terminal of the voltage means to limit the potential produced on the output terminal with all of the switching means in their second operative relationships.

6. In combination for providing a conversion between digital and analogue representations, a plurality of switching means each including first and second semi-conductors, means for providing a reference potential between first and second terminals, means coupled to each of the switching means for co-operating with the switching means to directly clamp one of the semi-conductors in the associated switching means to the potential at the first terminal in the reference means upon the introduction of a potential greater than a particular value to the switching means and to directly clamp the other semi-conductor in the associated switching means to the potential at the second terminal in the reference means upon the introduction of a potential less than a particular value to the switching means, a plurality of resistances each provided with a common output terminal and each connected at a second terminal to the first and second semi-conductors in a different one of the switching means for a connection of this terminal to the potential of the clamped semi-conductor and each provided with a value substantially twice as great as the value of the resistance connected to the preceding switching means, and means for introducing potentials above and below the particular value to the different switching means in the plurality in a pattern digitally representing the value of a quantity to obtain the production at the common output terminal of a potential related to the digital representation.

7. In combination for providing a conversion between digital and analogue representations, a plurality of switching means each including first and second semi-conductors, means including first and second terminals for providing a reference potential at the first terminal and for providing at the second terminal a particular potential relative to the reference potential, a plurality of impedances each having a value geometrically related to the values of the other impedances and each provided with a common output terminal and each connected at a second terminal to the first and second semi-conductors in a different switching means in the plurality, and means including the switching means for clamping the different switching means in the plurality directly at the reference or particular potentials in accordance with digital signal information introduced to the switching means and for applying the clamped potential in the switching means to the second terminal of the associated impedances to obtain at the output terminal a potential representing the digital information.

8. In combination for providing a conversion between digital and analogue representations, a plurality of resistances each having substantially a 2:1 ratio relative to a different resistance in the plurality and each provided with a common connection at a first terminal and provided with a second terminal, a plurality of switching means each including first and second semi-conductors connected to the second terminal of a different one of the resistances, a plurality of pairs of semi-conductors, means including at least a different pair of semi-conductors in a different one of the switching means for controlling the conductivity of either the coupled first semiconductor or the coupled second semi-conductor in accordance with the introduction to the pair of semi-conductors of an input potential greater or less than a particular value to clamp the second terminal of the associated resistance to the first terminal in the associated one of the resistances in the plurality upon a conductivity of the first semi-conductor or to the second terminal in the associated one of the resistances in the plurality upon a conductivity of the second semi-conductors in the plurality in digital representation of a particular value for the production at the common connection of a potential proportional to the particular value.

9. In combination for providing a conversion between digital and analogue representations, a plurality of impedances each provided with a value having a particular geometric relationship to the values of the other impedances and each connected to a common output terminal and each provided with a second terminal, means for providing a reference potential between first and second terminals, a plurality of switches each connected to couple the second terminal of a different one of the impedances to the first and second terminals of the reference means in accordance with the introduction of information to the switches, means for introducing a plurality of signals to the different switching means in the plurality in a pattern representing a particular quantity for the production at the output terminal of an output voltage proportional to the particular quantity, and an impedance connected between the common output terminal and a particular one of the terminals in the reference means and provided with a value geometrically related to the values of the impedances in the plurality to control the production of the output potential at the common output terminal.

10. In combination for providing a conversion between digital and analogue representations, a plurality of impedances each provided with a value geometrically related to the values of the other impedances in the plurality, and each provided with a common output terminal, means for providing a reference potential between first and second terminals, a plurality of switching means each connected to a different one of the impedance means to couple its associated impedance means to the first or second terminals in the reference means in accordance with the introduction of signals to the switching means for the production at the common output terminal of a potential related to the pattern of operation of the switching means, means for providing an input voltage, a comparator responsive to the input voltage and the voltage on the common output terminal to produce a potential representing the polarity of any difference between the compared voltages, a counter having a plurality of stages each coupled to a different one of the switching means for controlling the operation of the switching means, and means for providing for the introduction of signals to the counter in accordance with the potential produced by the comparator to adjust the voltage on the common output terminal to the input voltage and to provide in the counter a ratio between the input and reference potentials.

11. In combination for providing a conversion between digital and analogue representations, a plurality of impedances each having a value geometrically related to the values of the other impedances and each having a commonly connected first terminal and having a second terminal, means including first and second terminals for providing an adjustable reference potential between the first and second terminals, a plurality of switching means each associated with a different one of the impedances for coupling the second terminal of the associated impedance to the first or second terminal of the reference means, means for providing an input voltage, means including a comparator for comparing the input voltage and the voltage on the common output terminal to obtain signals representing any differences in the comparison and the polarity of the differences in such comparison, and means including a counter responsive to the difference signals for adjusting the count in the counter and coupled to the switching means for producing corresponding adjustments in the operation of the switching means to obtain at the common output terminal a potential corresponding to the input potential and to obtain in the counter a digital representation of the ratio between the input and reference potentials.

12. In combination for providing a conversion between digital and analogue representations, means for providing an input voltage, means including first and second terminals for providing a variable reference potential between the first and second terminals, a plurality of switching means each having first and second states of operation, a plurality of impedances each provided with a common first terminal and with a second terminal connected to a different one of the switching means to couple the second terminal of the impedance to the first or second terminals of the reference means in accordance with the operation of the switching means, means including a comparator for comparing the input voltage and the potential on the common first terminal of the impedances to produce a potential representing any differences in such comparison and the polarity of such differences, means including a chopper for converting the difference potential from the comparator into an alternating voltage having characteristics related to the difference potential, and means including a counter having a plurality of stages and responsive to the difference signals from the chopper for adjusting the count in the counter to a value representing the ratio between the input and reference potentials and representing an equality between the input potential and the potential on the common output terminal, and means including the counter for coupling the output from each stage of the counter to a different one of the switching means to control the operation of the associated switching means in the first and second relationships in accordance with the output from the counter stage.

13. In combination for providing a conversion between digital and analogue quantities, means including first and second terminals for providing a variable reference potential between the first and second terminals to represent a reference quantity proportional to the reference potential, a plurality of resistances each having substantially a 2:1 ratio in value relative to a different one of the other resistances in the plurality and each provided with a first terminal and a second terminal common to the second terminals of the other resistances, a plurality of switching means each connected to a different one of the resistances and to the first and second terminals of the reference means and each operative in a first relationship to couple the first terminal of the associated resistance to the first terminal of the reference means and each operative in a second relationship to couple the first terminal of the associated resistance to the second terminal of the reference means, and means for providing a plurality of signals digitally representing an input quantity and for setting the switching means into a pattern of first and second operative relationships in accordance with the pattern of the digital signals to obtain at the common second terminal of the resistances a potential representing the product of the input quantity and the reference potential.

14. In combination for providing a conversion between digital and analogue quantities, means including first and second terminals for providing a variable reference potential between the first and second terminals to represent a reference quantity proportional to the reference potential, a plurality of switching means each operative in a first relationship to provide a coupling to the first terminal of the reference means and each operative in a second relationship to provide a coupling to the second terminal of the reference means, a counter including a plurality of stages each coupled to a different one of the switching means to produce an operation of the switching means in the first relationship upon the introduction of signals having amplitudes less than a particular value to the stage and to produce an operation of the switching means in the second relationship upon the introduction of signals having amplitudes greater than the particular value to the stage, a plurality of impedances each having a value geometrically related to the values of the other impedances in the plurality and each provided with a first terminal common to the first terminals of the other impedances and each provided with a second terminal, the second terminal of each impedance being connected to a different one of the switching means for a coupling of this terminal to the first or second terminals of the reference means in accordance with the operative relationship of the switching means, and means for providing for the introduction of a plurality of signals having amplitudes greater or less than the particular value in a pattern digitally related to the value of an input quantity to obtain the production at the common first terminal of a potential representing the product of the input and reference quantities.

15. In combination for providing a conversion between digital and analogue representations, a counter formed from a plurality of bistable stages each constructed to have first and second stable states of operation, means including a plurality of first and second terminals for providing a variable reference potential between the first and second terminals, a plurality of resistances each having a value with substantially a 2:1 ratio relative to the value of a different one of the other resistances in the plurality and each providedd with a common first terminal and with a second terminal, a plurality of switching means each provided with a terminal connected to the second terminal of a different one of the resistances and each including first and second semi-conductors, means coupled to the first and second semi-conductors in each switching means and to a different bistable stage in the counter for producing a flow of current through the first semi-conductor upon the first state of operation in the associated bistable stage to clamp the second terminal of the associated resistance to the first terminal of the reference means and for producing a flow of current through the second semi-conductor upon the second state of operation in the associated bistable stage to clamp the second terminal of the associated resistance to the second terminal of the reference means, and means for introducing to the different stages in the counter a plurality of signals having a pattern digitally related to the value of an input quantity and having characteristics for the production of first and second states of operation in a corresponding pattern in the bistable stages for the production at the common first terminal of a voltage representing the product of the input and reference quantities.

16. In combination for providing a conversion between digital and analogue representations, a plurality of resistances each provided with a value having substantially a 2:1 ratio to the value of a different one of the other resistances in the plurality and each provided with a common first terminal and with a second terminal, means including first and second terminals for providing a variable reference potential between the first and second terminals, a plurality of switching means each including a first pair of semi-conductors, the semi-conductors in each of the first pairs having their first terminals connected to the second terminal of a different one of the resistances and having their second terminals respectively connected to the first and second terminals in the reference means, a counter having a plurality of bistable stages each connected to become triggered to first or second states of operation in accordance with the introduction of triggering signals to the stage, means for providing an input voltage, means including a plurality of second pairs of semi-conductors each coupled to the first pair of semi-conductors in a different one of the switching means to obtain a flow of current through a particular one of the semi-conductors in the associated first pair in accordance with the introduction of signals above or below a particular value to the semi-conductors in the second pair and to obtain a direct clamping of the second terminal in the associated resistance to the first or second terminals of the reference means in accordance with the conductivity of the particular conductor in the associated first pair, means including a comparator for comparing the input voltages and the voltage on the common first terminal of the resistances to obtain a potential representing any difference between the two compared voltages and representing the polarity of any such difference, means including a chopper for converting the difference potential to signals representing such difference and for triggering the bistable stages in the counter to the first or second states of operation in accordance with such difference signals, and means for coupling each stage in the counter to a different one of the second pairs of semi-conductors in the plurality to provide for the introduction to these semi-conductors of signals above or below the particular value in accordance with the operation of the stage in the first or second states to obtain a correspondence in values between the input voltage and the voltage on the common first terminal of the resistances and for the production in the counter of digital indications representing the ratio between the input and reference potentials.

17. In combination for providing a conversion between digital and analogue representations, a plurality of resistances each having a value geometrically related to the values of the other resistances in the plurality and each provided with a common first terminal and with a second terminal, means including first and second terminals for providing a reference potential between the first and second terminals, means including a plurality of switching means each coupled to a different one of the resistances in the plurality and each operative in a first relationship to couple the second terminal of the associated resistance to the first terminal of the reference means and operative in a second relationship to couple the second terminal of the associated resistance to the second terminal of the reference means, means for providing an input voltage, means including a comparator for producing a potential representing any difference between the input voltage and the voltage on the common first terminal and representing any polarity of such difference, means including a counter having a plurality of stages for providing in the stages a digital representation and coupled to the switching means for producing a pattern of operation in the switching means corresponding to the pattern of operation in the counter stages, and means including electrical circuitry for producing at recurrent intervals signals representing unitary increments in the difference potential and for introducing the incremental signals to the counter to obtain corresponding incremental changes in the count provided in the counter.

18. Converting apparatus as set forth in claim 17 in which amplitude discriminators are provided to distinguish between difference potentials above or below a particular level and in which gating means are included to obtain a triggering of a particular stage of low digital significance in the counter for difference potentials below the particular value and to obtain a triggering of a particular stage of increased digital significance in the counter for difference potentials above the particular value.

19. In a converter for providing a conversion between digital and analogue representations, a first semi-conductor having an emitter, a base and a collector, a second semi-conductor having an emitter, a base and a collector, means for providing a reference potential between first and second terminals and for connecting the collector of the first semi-conductor to the first terminal of the reference means and for connecting the collector of the second semi-conductor to the second terminal of the reference means, a precision resistance having a particular value and provided with first and second terminals and having its first terminal serve as an output terminal and having its second terminal connected to the emitters of the first and second semi-conductors, means for providing an input potential having first particular value to represent a first binary value and having a second particular value to represent a second binary value, and means for introducing the first and second input potentials to the bases of the first and second semi-conductors to obtain a flow of current between the collector and base and the emitter and base of the first semi-conductor upon the introduction of the first input potential for a clamping of the second terminal of the precision resistance to the first terminal of the reference means and to obtain a flow of current between the collector and base and the emitter and base of the second semi-conductor upon the introduction of the second input potential for a clamping of the second terminal of the precision resistance to the second terminal of the reference means.

20. In a converter for providing a conversion between digital and analogue representations, a first semi-conductor having an emitter, a base and a collector, a second semi-conductor having an emitter, a base and a collector, means including first and second terminals for providing a reference potential between the first and second terminals and for connecting the first terminal to the collector of the first semi-conductor and for connecting the second terminal to the collector of the second semi-conductor, a precision resistance having a particular value and provided with first and second terminals and having its first terminal serve as an output terminal and having its second terminal coupled to the emitters of the first and second semi-conductors, an input terminal, means for introducing an input potential greater than a particular value to the input terminal to represent a first binary value and for introducing an input potential less than the particular value to the input terminal to represent a second binary value, a third semi-conductor coupled to the input terminal and coupled to the reference means for the reception of a potential related to the potential on the first terminal of the reference means to obtain a flow of current through the semi-conductor in accordance with the introduction from the input terminal of input potentials greater or less than the particular value for the production from the semi-conductor of the input potential or the potential from the reference means in accordance with such current flow, a fourth semi-conductor coupled to the third semi-conductor and coupled to the reference means for the reception of a potential related to the potential on the second terminal of the reference means to obtain a flow of current through the semi-conductor in accordance with the introduction from the third semi-conductor of the input potential or the potential from the reference means for the production from the fourth semi-conductor of the potential related to the potentials on the first or second terminal of the reference means in accordance with the flow of current or lack of current flow through the fourth semi-conductor, and means for introducing the potential from the fourth semi-conductors to the bases of the first and second semi-conductors to obtain a flow of current between the collector and base and the emitter and base of the first semi-conductor upon the introduction of the potential related to that on the first terminal of the reference means for a clamping of the second terminal of the precision resistance to the first terminal of the reference means and to obtain a flow of current between the collector and base and the emitter and base of the second semi-conductor upon the introduction of the potential related to that on the second terminal of the reference means for a clamping of the second terminal of the precision resistance to the second terminal of the reference means.

21. In the converter set forth in claim 19, pluralities of first and second semi-conductors and precision resistances and input potential means connected in different branches in a manner similar to that recited for the first and second particular semi-conductors and the particular precision resistance and the particular input potential means and having all of the first terminals of the precision resistances in the plurality connected as a common output terminal to produce on the common output terminal a potential having an amplitude directly related to the value of the quantity digitally represented by the pattern of the input signals from the different input potential means in the plurality.

22. In the converter set forth in claim 20, pluralities of first, second, third and fourth semi-conductors and precision resistances and input potential means connected in different branches in a manner similar to that recited for the first and second particular semi-conductors and the particular precision resistance and the particular input potential means and having all of the first terminals of the precision resistances in the plurality connected as a common output terminal to produce on the common output terminal a potential having an amplitude directly related to the value of the quantity digitally represented by the pattern of the input signals from the different input potential means in the plurality.

References Cited in the file of this patent

UNITED STATES PATENTS

| | | |
|---|---|---|
| 2,747,797 | Beaumont | May 29, 1956 |
| 2,793,807 | Yaeger | May 28, 1957 |
| 2,820,153 | Woll | Jan. 14, 1958 |
| 2,848,628 | Altschul | Aug. 19, 1958 |
| 2,895,673 | Williams | July 21, 1959 |

OTHER REFERENCES

Smith: Coding by Feedback Methods, Proceedings of the I.R.E., Aug. 1953. (Pages 1053 to 1055 relied on.)

Fletcher et al.: Analog Measurement and Conversion to Digits, 341–5 relied on. Sept. 1955, ISA Journal, vol 2.

Braymer: Analog to Digital Conversion, reprint No. S–12, Nov. 1956, Beckman Systems Division.

Palevsky: Hydrid—Analog-Digital Computing Systems, Instrument & Automation, Oct. 1957. (Pages 1877–1880 relied on.)